United States Patent
Okochi et al.

(10) Patent No.: US 10,338,771 B2
(45) Date of Patent: Jul. 2, 2019

(54) CONTROL DEVICE FOR INJECTION MOLDING MACHINE AND SCREEN DISPLAY METHOD

(71) Applicant: MITSUBISHI HEAVY INDUSTRIES PLASTIC TECHNOLOGY CO., LTD., Nagoya-shi, Aichi (JP)

(72) Inventors: Yasuo Okochi, Nagoya (JP); Takashi Takii, Nagoya (JP); Toshihiko Kariya, Nagoya (JP)

(73) Assignee: U-MHI PLATECH CO., LTD., Nagoya-Shi, Aichi (JP)

( * ) Notice: Subject to any disclaimer, the term of this patent is extended or adjusted under 35 U.S.C. 154(b) by 527 days.

(21) Appl. No.: 14/787,131

(22) PCT Filed: Nov. 7, 2013

(86) PCT No.: PCT/JP2013/006558
§ 371 (c)(1),
(2) Date: Oct. 26, 2015

(87) PCT Pub. No.: WO2014/192048
PCT Pub. Date: Dec. 4, 2014

(65) Prior Publication Data
US 2016/0082504 A1   Mar. 24, 2016

(30) Foreign Application Priority Data

May 31, 2013 (JP) ................................. 2013-114953

(51) Int. Cl.
*G06F 3/048* (2013.01)
*G06F 3/0482* (2013.01)
(Continued)

(52) U.S. Cl.
CPC ........... *G06F 3/0482* (2013.01); *B22D 17/32* (2013.01); *B29C 45/76* (2013.01); *B29C 45/762* (2013.01);
(Continued)

(58) Field of Classification Search
CPC ... G06F 3/0482; G06F 3/04842; B22D 17/32; B29C 45/76; B29C 45/762;
(Continued)

(56) References Cited

U.S. PATENT DOCUMENTS 6,381,512 B1    4/2002  Saitou et al.
2006/0235568 A1 * 10/2006 Araki ................... B29C 45/76
                                                    700/200
(Continued)

FOREIGN PATENT DOCUMENTS

EP          0961186 A2    12/1999
JP          H05-069464 A   3/1993
(Continued)

OTHER PUBLICATIONS

Europe Patent Office, "Search Report for European Patent Application No. 13885521.8," dated Jan. 2, 2017.
(Continued)

*Primary Examiner* — Kieu D Vu
*Assistant Examiner* — Asteway T Gattew
(74) *Attorney, Agent, or Firm* — Manabu Kanesaka; Ben Hauptman; Kenneth Berner

(57) ABSTRACT

Provided is a control device for an injection molding machine, capable of reducing the load on a user when re-displaying a previously displayed screen. The control device (20) for the injection molding machine (1) controls the display of display images on a display unit (29). This control device (20) divides the display unit (29) into a first display area (31) and a second display area (32) and, if an (Continued)

instruction to scroll in the vertical direction is received when a first display image (P1) is displayed in the first display area (31) and a second display image (P2) is displayed in the second display area (32), synchronously scrolls the first display image (P1) and the second display image (P2) whilst maintaining the relative positions of the first display image (P1) and the second display image (P2).

20 Claims, 13 Drawing Sheets

(51) Int. Cl.
  *B22D 17/32* (2006.01)
  *B29C 45/76* (2006.01)
  *G06F 3/0484* (2013.01)

(52) U.S. Cl.
  CPC ........ *B29C 45/766* (2013.01); *G06F 3/04842* (2013.01); *B29C 2045/7606* (2013.01); *B29C 2945/76939* (2013.01); *B29C 2945/76949* (2013.01)

(58) Field of Classification Search
  CPC .......... B29C 45/766; B29C 2045/7606; B29C 2945/76939; B29C 2945/76949
  See application file for complete search history.

(56) References Cited

U.S. PATENT DOCUMENTS

| | | | | |
|---|---|---|---|---|
| 2006/0236261 | A1* | 10/2006 | Forstall | G06F 3/0485 715/784 |
| 2007/0254722 | A1* | 11/2007 | Kim | G06F 3/0485 455/566 |
| 2011/0047573 | A1* | 2/2011 | Onogi | H04N 5/44543 725/41 |
| 2013/0100032 | A1* | 4/2013 | Miyazaki | B29C 45/76 345/169 |
| 2013/0262980 | A1* | 10/2013 | Uyama | G06F 17/2247 715/234 |

FOREIGN PATENT DOCUMENTS

| | | | |
|---|---|---|---|
| JP | H11115023 | * | 4/1999 |
| JP | 2001-145947 A | | 5/2001 |
| JP | 2004-082649 A | | 3/2004 |
| JP | 2005-231251 A | | 9/2005 |
| JP | 2006-297671 A | | 11/2006 |
| JP | 2007-196604 A | | 8/2007 |
| JP | 2013-91183 A | | 5/2013 |

OTHER PUBLICATIONS

PCT, "International Search Report for International Application No. PCT/JP2013/006558".

* cited by examiner

FIG. 10
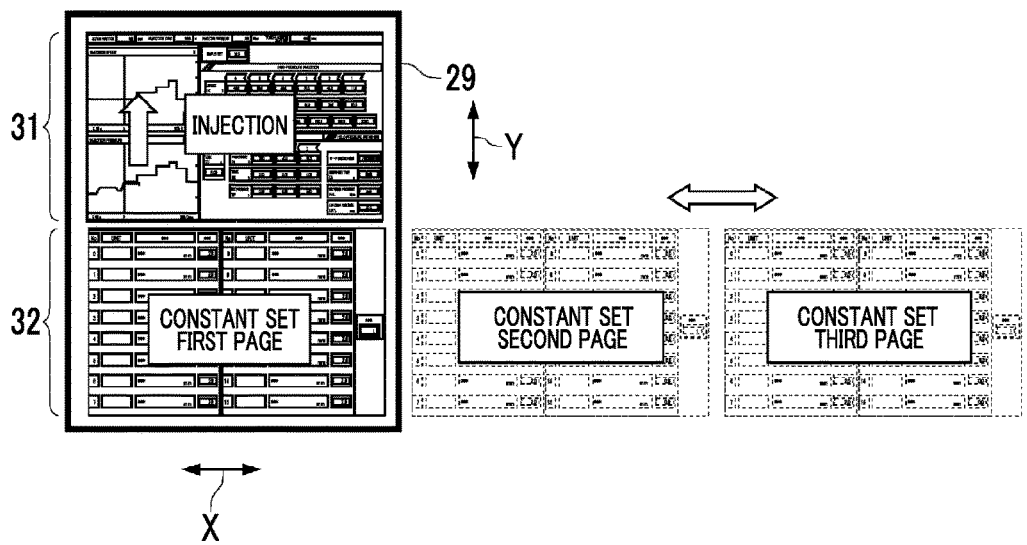
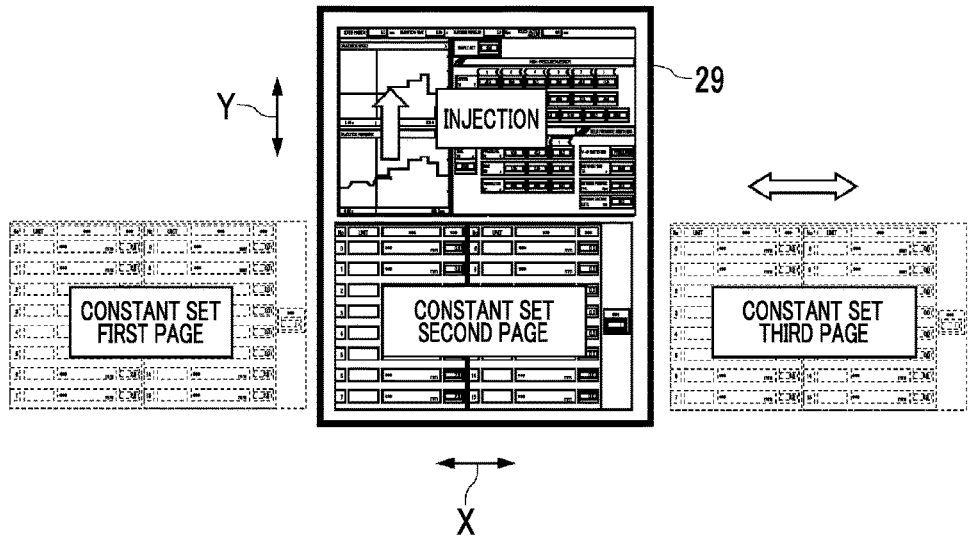

FIG. 12

CONTROL DEVICE FOR INJECTION MOLDING MACHINE AND SCREEN DISPLAY METHOD

RELATED APPLICATIONS

The present application is National Phase of International Application No. PCT/JP2013/006558 filed Nov. 7, 2013, and claims priority from Japanese Application No. 2013-114953, filed May 31, 2013, the disclosure of which is hereby incorporated by reference herein in its entirety.

TECHNICAL FIELD

The present invention relates to a control device for an injection molding machine, and particularly, to display of a screen included in a control device.

BACKGROUND ART

An injection molding machine includes a plurality of devices such as a mold clamping device, an injection device, or a molded part discharging device, as components, and when the injection molding machine is operated, operation conditions should be set by a control device with respect to each of the plurality of devices. In general, in the injection molding machine, a setting screen or an execution value display screen is provided on the control device in each of the plurality of devices or in each of the related devices. Accordingly, in the setting screen of the control device, switching and input between many control screens should be diversely performed.

In general, a display button is provided on each screen, in which a list is displayed on a menu screen, corresponding to each setting screen or each execution value display screen, a screen desired for displaying is selected from menu buttons, and the screen is displayed.

However, the selection of the menu screen is hierarchically logical, the selection of the menu button needs to be repeated a number of times corresponding to the hierarchy in order to reach the desired image, and operability is impaired.

For example, in addition, when a previously displayed image, which has been displayed before being switched to the setting screen displayed at the present time, is redisplayed, it is necessary to hierarchically select the display image from the menu screen.

Particularly, the hierarchical configuration may cause the user to forget which hierarchy at which the desired image has been displayed. Accordingly, even when the desired image is not an image which has been displayed long before, if each hierarchy is not searched for in a trial and error method, an operation time until reaching the desired image lengthens. Accordingly, stress on a user increases, the operation of the injection molding machine is delayed, and productivity decreases.

In order to solve the above-described problems, it has been suggested that a plurality of desired setting screens are displayed to be simultaneously arranged on a display area and are displayed on each screen so as to be scrollable to improve operability (for example, PTLs 1 and 2).

CITATION LIST

Patent Literature

[PTL 1] Japanese Unexamined Patent Application Publication No. 5-9464

[PTL 2] Japanese Unexamined Patent Application Publication No. 2006-297671

SUMMARY OF INVENTION

Technical Problem

According to PTLs 1 and 2, the operability is improved by displaying a plurality of setting images on one display screen. However, since it is assumed that the selection of images is hierarchically performed, there is still room for improvement of the operability. For example, also in PTLs 1 and 2, when a display image which is not displayed at the present time but has been previously displayed is displayed again, selecting the previously displayed image hierarchically is still required.

Accordingly, an object of the present invention is to provide a control device for an injection molding machine capable of reducing a load on a user when re-displaying a previously displayed image.

Solution to Problem

A control device for an injection molding machine of the present invention includes a display unit which displays a single display image or a plurality of display images including information relating to molding conditions of an injection molding machine, a control unit which controls display of the display image on the display unit, and a storage unit which stores a display history associated with a temporal order in which the plurality of display images are displayed on the display unit. The control unit divides the display unit into a first display area and a second display area, and is able to display a first display image on the first display area and a second display image on the second display area, and when the control unit receives an instruction to scroll in a first direction, the control unit scrolls the plurality of display images to be displayed on the display unit in a state where an anteroposterior relationship in the temporal order in the display of the display images stored in the storage unit with respect to at least one of the first display image displayed on the first display area or the second display image displayed on the second display area is maintained.

According to the control device of the present invention, two display images, which are displayed to be adjacent to each other and can be displayed according to an arbitrary combination by separate selections managed independently from each other, can be scrolled in a state where the two display images are connected to each other. Accordingly, when a user wants to redisplay a display image (previously displayed image) which is not displayed at the present time, the user can display the previously displayed image by simply giving a scroll instruction. Therefore, according to the present invention, since work such as in a case where a user must remember the name of the previously displayed image while depending on a user's memory or the user selects the previously displayed image from a menu screen again is not required, it is possible to reduce a load on the user. In addition, since the connected two display images can be combination of two display images which are individually selected from arbitrary display images managed independently from each other and are required to be reliably displayed by the user at the present time, it is possible to search for the display image without depending on the user's memory, and it is possible to display a desired display image at an optimum timing. As a result, since it is possible to effectively and rapidly realize operation conditions setting without stress, it is possible to prevent an erroneous operation due to misunderstanding of the user or the like or it is possible to reduce waste time until a desired display screen is displayed.

The control device of the present invention can have a standard display mode in which the display unit is divided into the first display area and the second display area, and the single display image or the plurality of display images are displayed, and an extension display mode in which the single display image is displayed on the entire display area of the display unit. In addition, when one of the first display image and the second display image which are displayed in the standard display mode is selected, the control device of the present invention can display either the selected first display image or the selected second display image in the extension display mode.

When there is a display image which cannot be completely displayed within the range of the first display area or the second display area in the standard display mode, if a portion which is not displayed in the standard display mode can be displayed in the extension display mode, it is possible for the user to be relieved from the operation such as scrolling. In addition, since it is possible to comprehend many continuous operation data values such as a trend list or operation condition values in which the entire balance is important at a glance without scrolling to a screen which is less frequently displayed, it is possible to easily evaluate the entire variation or balance.

In the present invention, preferably, even when display respect to one of the first display image and the second display image which are not selected is interrupted, the display history is maintained in the storage unit. This reason is because the image may be required to be displayed after the display is interrupted.

In addition, in the present invention, an interruption state of display means a state where even when the display is not performed, the display image remains in the display history, and the display can be immediately displayed if requested. Meanwhile, a stopping state of display means a state where the display is not performed and a display image is erased from a display history.

When the first display image having an older position in a display history and the second display image having a newer position in a display history are displayed, in a case where a new and third display image is required to be displayed, the control device of the present invention can display the third display image to be adjacent to the second display image, and interrupt the display of the first display image. In this case, in display of the third display image, for example, preferably, the third display image slides in so as to gradually appear from the lower end of the display unit while the second display image is pressed and scrolled from the lower side of the second display image, and the first display image is made to disappear by gradually sliding out from information of the first display image so as to be pushed from the upper end of the display unit. Accordingly, it is possible to easily understand whether the position of the upper image in the display history is newer or older. Specifically, in this case, since the image displayed on the lower side is the image selected after the image displayed on the upper side, when the user wants to display an image having an older position in a display history, it is to possible to easily recognize a screen and display a desired screen by simply scrolling the screen down, and operability is improved. In addition, when the user wants to display an image having an older position in a display history so that the new and third display image appears from the upper end of the display unit, the second display image is pushed toward the lower side, and the first display image is scrolled so as to disappear from the lower end of the display unit, scrolling upward may be performed.

For example, when the newly selected third display image is displayed so as to be adjacent to the second display image which is positioned at a hierarchy above that of the third display image and display of the first display image having an older position in a display history is interrupted, an user can rapidly perform the setting operation of the conditions without performing a specific operation, and the load on the user is reduced.

Each display image in the control device of the present invention can include the extension display mode. In this case, when a display image having an older position in a display history is displayed in the extension display mode, if a new display image is required to be displayed, the new display image can be displayed in the extension display mode and display of the display image having an older position in a display history can be interrupted.

In addition, when the display image having an older position in a display history is displayed in the extension display mode, if a new display image is required to be displayed, the display image having an older position in a display history is displayed in the standard display mode again, a new display image is displayed in the standard display mode, and the new display image may be displayed above or below the display image having an older position in a display history according to an anteroposterior relationship in the display history.

In addition, when the display image having an older position in a display history is displayed in the standard display mode, if a new display image in which a default display mode described below is the extension display mode is required to be displayed, the display image having an older position in a display history displayed in the standard display mode slides upward or downward, and the new display image may be displayed in the extension display mode.

In the control device of the present invention, when the first display image and the second display image are displayed to be adjacent to each other, at least one of the selected first display image and the selected second display image can be locked so as not to be scrollable.

In the control device of the present invention, in principle, the first display image and the second display image are synchronized with each other and able to be scrolled. However, there may be also an exception such as locking. Since the lock function with respect to the scrolling is provided, it is possible to scroll display images in other display histories while directly referring to information required to be referred to in a state where the information is always locked. For example, when the first display image, the second display image, and the third display image are arranged in this order in the display history, if the first display image is scrolled in a state where the second display image is locked, it is possible to display the third display image on the area in which the first display image has been displayed. Accordingly, for example, when setting images of a mold clamping process, an injection process, and a plasticization process are arranged so as to be connected to each other in the display history, if a setting image of the mold clamping process is locked, setting images of two processes of the injection process and the plasticization process can be alternately exchanged using the scrolling. Therefore, since the user can input and set setting conditions of each of the injection process and the plasticization process while viewing setting conditions of the mold clamping process, it is possible to reduce a load on a setting operation of a user.

In the control device of the present invention, preferably, information specifying the display image, which is not displayed but remains in the display history, is displayed on the display unit.

Even when a memory of the user is unreliable, since a display image, which can be displayed by simply performing scrolling, can be certainly specified before the scrolling is performed, it is easy to use the control device.

In the control device of the present invention, when the first display image and the second display image are displayed on the display unit to be adjacent to each other, it is possible to stop the display with respect to one or both of the selected first display image and the selected second display image.

Since only necessary display images can be displayed by stopping display, that is, erasing a display history, a user does not feel stress due to unnecessarily displayed images, and an injection molding machine having high operability is provided.

In the control device of the present invention, when the first display image is displayed on the first display area and the second display image is displayed on the second display area, based on an instruction, display positions can be exchanged with each other such that the first display image is displayed on the second display area and the second display image is displayed on the first display area.

Since arrangement according to intention of a user can be realized by a simple operation, it is possible to eliminate stress on the user.

In the control device of the present invention, when the first display image is displayed on the first display area and the second display image is displayed on the second display area, scrolling in a second direction orthogonal to the first direction can be allowed in one or both of the first display area and the second display area.

Advantageous Effects of Invention

According to the present invention, when a user wants to redisplay a display image (previously displayed image) which is not displayed at the present time, it is possible to display the previously displayed image by simply giving a scroll instruction. Therefore, according to the present invention, since a case where a user must remember the name of the previously displayed image while depending on a user's memory or a case where a user selects the previously displayed image from the menu screen again is not required, it is possible to reduce a load on the user.

Figure 9:
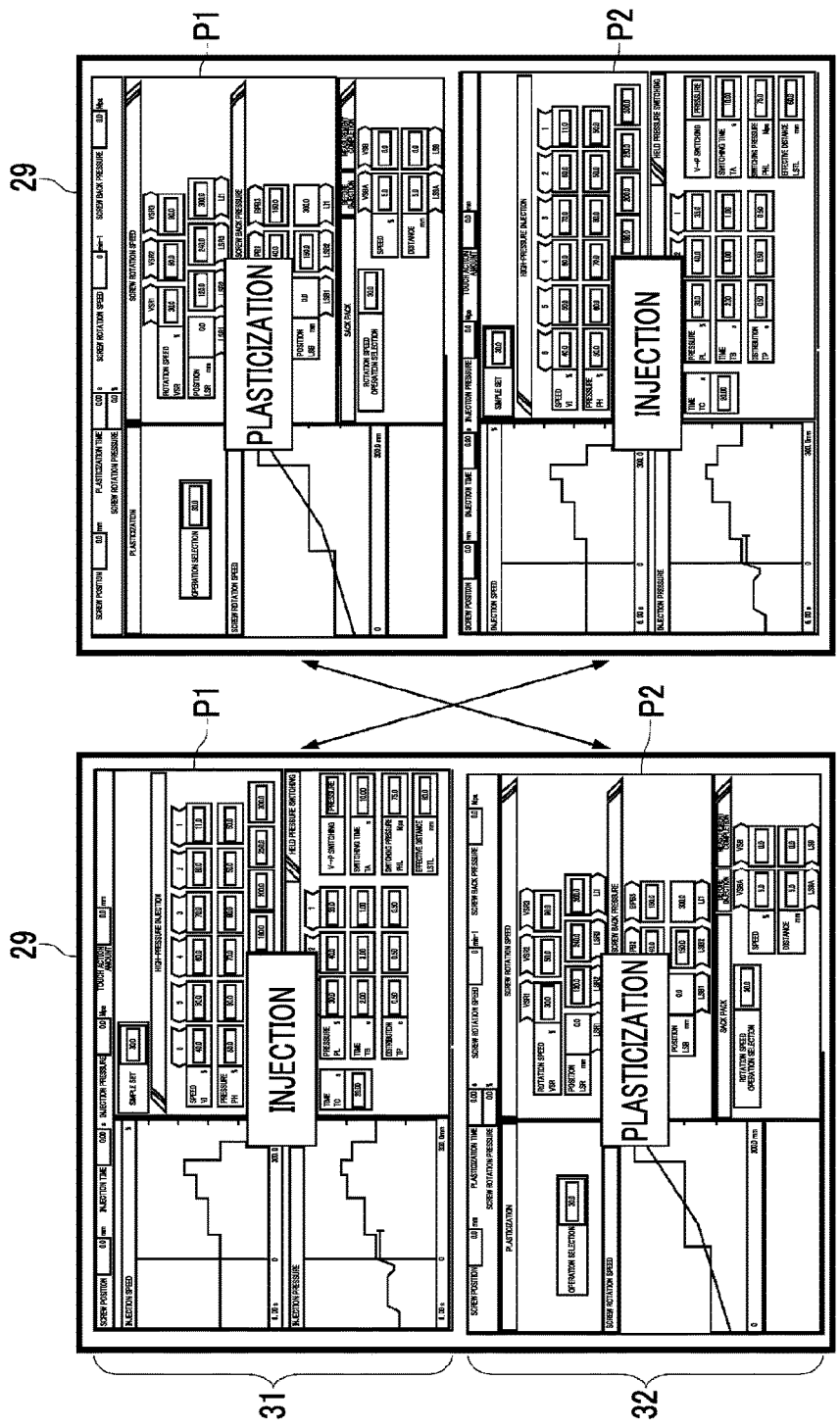

A right drawing of FIG. 9 shows a display example before positions of the display images are exchanged with each other, and a left drawing of FIG. 9 shows a display example after the positions of the display images are exchanged with each other.

FIG. 10 shows an example in which one display image of two display images is scrolled in a horizontal direction, (a) shows a display example before the display image is scrolled in the horizontal direction, and (b) shows a display example after the display image is scrolled in the horizontal direction.

Figure 11:
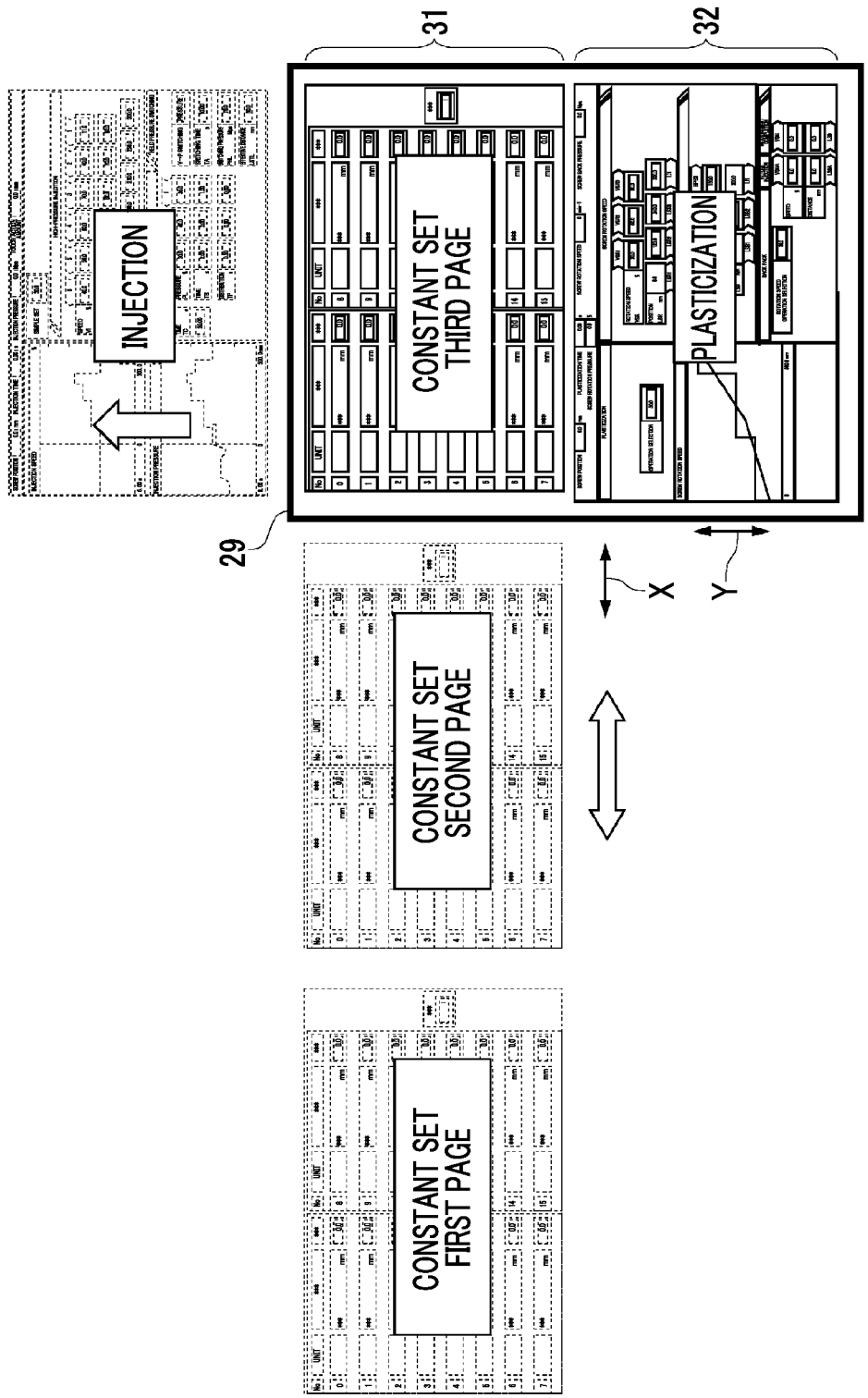

FIG. 11 shows another example in which one display image of two display images is scrolled in the horizontal direction.

Figure 12:
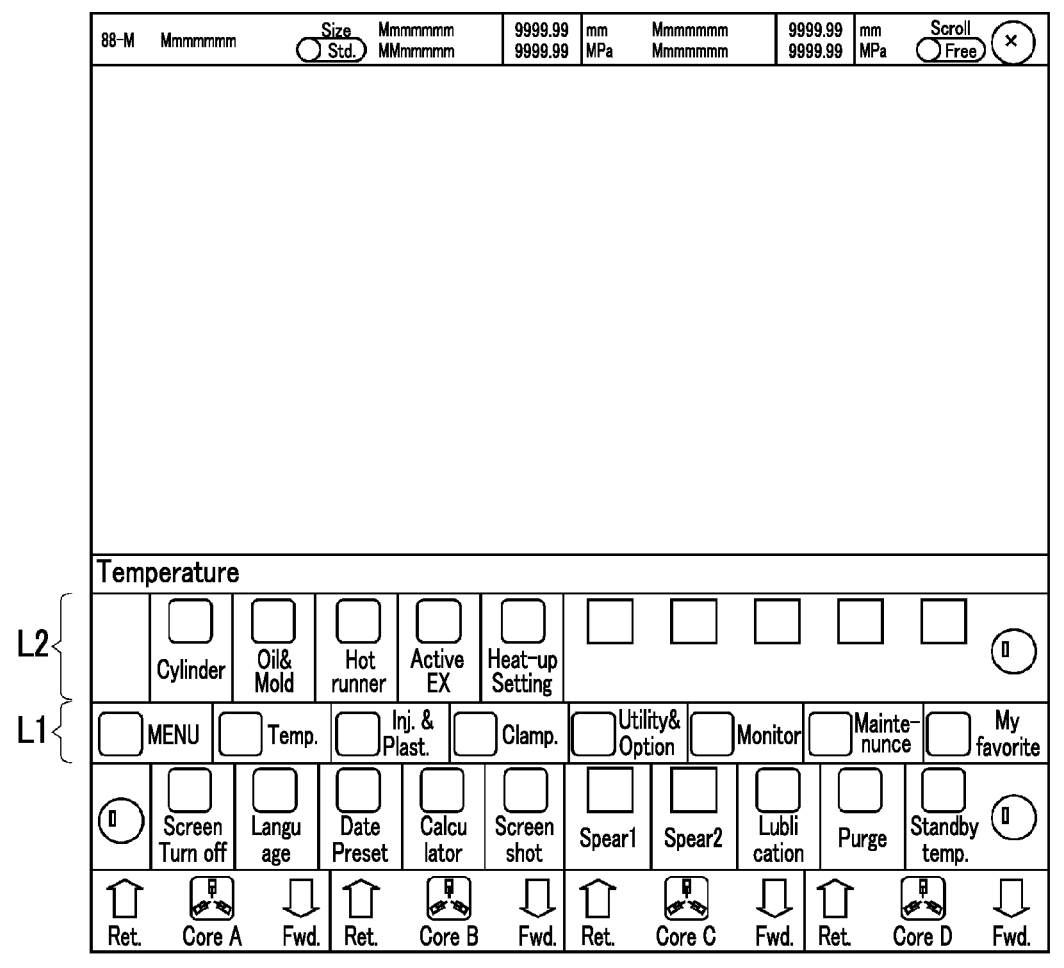

FIG. 12 is a menu button example of each display image and shows a display example in which menu buttons are displayed hierarchically.

Figure 13:
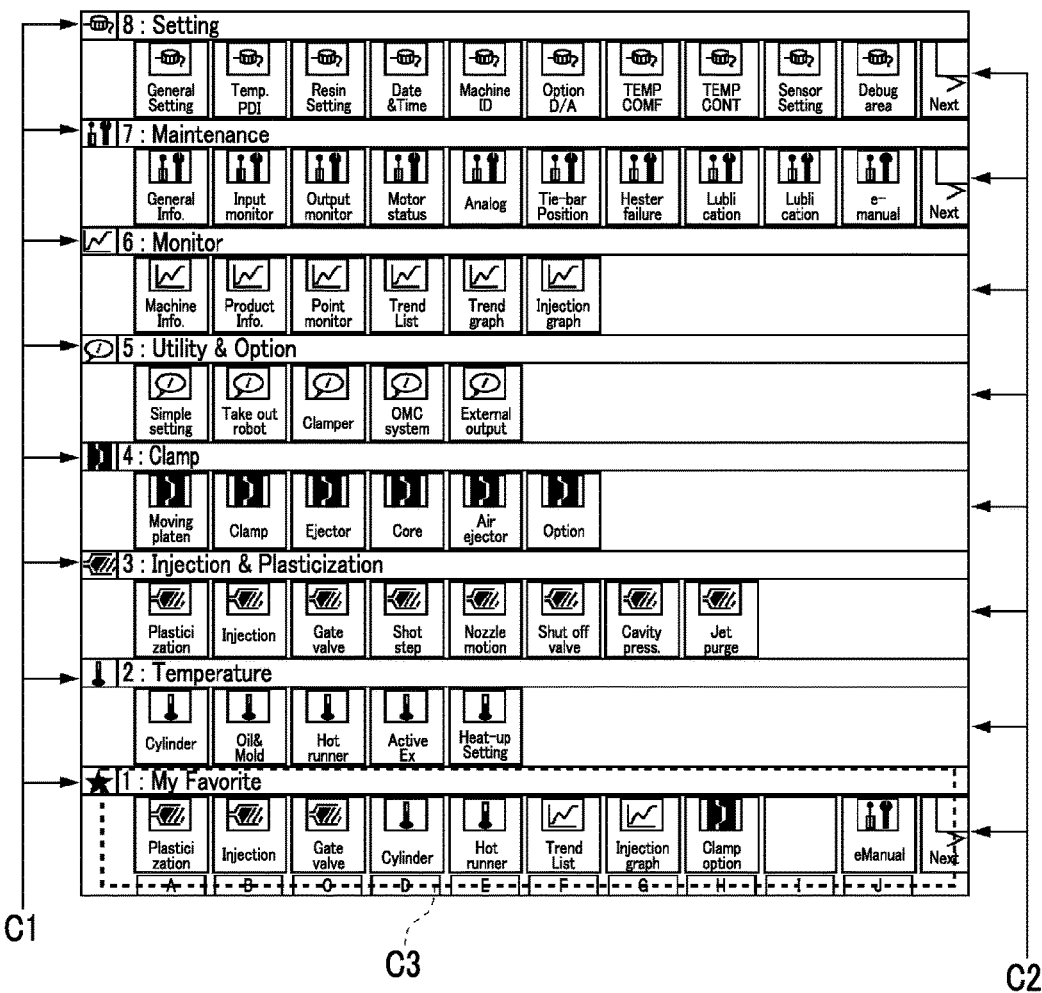

FIG. 13 is a menu button example of each display menu and shows a display example in which the menu buttons are displayed as a list.

DESCRIPTION OF EMBODIMENTS

Hereinafter, the present invention will be described in detail based on an embodiment shown in the accompanying drawings.

An injection molding machine 1 of the present embodiment includes a molding machine main body 10, and a control device 20 which controls operations of the molding machine main body 10. An injection molding machine 1 has characteristics with respect to a method for performing display on a display unit 29 included in the control device 20. In addition, the present embodiment is described with reference to the injection molding machine 1 which is driven by a hydraulic actuator (hydraulic mechanism). However, instead of a hydraulic actuator, an electric actuator which is driven by an electric motor such as a servo motor, an inverter motor, or an interior permanent magnet motor may be applied to the injection molding machine 1.

The molding machine main body 10 includes a mold clamping unit 11 and a plasticizing unit 15.

The mold clamping unit 11 includes a stationary platen 12 to which a fixed mold (not shown) is attached, and a movable platen 13 to which a movable mold (not shown) is attached. The mold clamping unit 11 includes a hydraulic mechanism which moves the movable platen 13 toward the stationary platen 12, and before injection molding is performed, the mold clamping unit 11 moves the movable platen 13 and causes the movable mold to come into contact with the fixed mold. In addition, after pressure of hydraulic oil of the hydraulic mechanism increases, the movable mold and the fixed mold are clamped to each other to perform mold clamping, a molten resin is injected from the plasticizing unit 15 to a cavity formed between the movable mold and the fixed mold, and a molded part is obtained.

The plasticizing unit 15 includes a heating cylinder 16 in which a discharging nozzle is formed on a front side which is the mold clamping unit 11 side, and a screw (not shown) which is provided in the inner portion of the heating cylinder 16. The plasticizing unit 15 also includes components such as a drive source (not shown) which moves the screw forward and rearward, a drive source (not shown) which rotates the screw normally or reversely, or a fuel hopper (not shown) for supplying a resin fuel into the inner portion of the heating cylinder 16.

In the plasticizing unit 15, when the screw rotates, for example, a pellet-shaped thermoplastic resin supplied from the fuel hopper is transported to the front side of the heating cylinder 16. In the transport process, the resin pellets are gradually heated and melted, and accumulate at the front side of the screw. The screw receives pressure of the resin generated by the accumulation, and measures a predetermined amount of molten resin at the front side of the screw while moving toward the fuel hopper side. Thereafter, a predetermined measured amount of molten resin is injected from the discharging nozzle into the cavity formed between the fixed mold and the movable mold of the mold clamping unit 11.

In order to obtain the molded part using the injection molding machine 1 including the above-described elements, the following processes are performed in order. That is, the molded part is obtained via a mold clamping process of closing the movable mold and the fixed mold and performing mold clamping at high pressure, a plasticization process of heating, melting, and plasticizing the resin pellets in the inner portion of the heating cylinder 16, an injection process of injecting the plasticized molten resin into the cavity formed between the movable mold and the fixed mold and filling the cavity with the resin, a cooling process of cooling the molten resin filling the cavity until the molten resin is solidified, a mold opening process of opening the mold, and an extraction process of extracting the molded part cooled and solidified in the cavity.

The molding machine main body 10 includes various sensors in the mold clamping unit 11 and the plasticizing unit 15, and sensing information SR which is obtained by the sensors while the above-described processes are performed is sent to the control device 20. For example, as the sensing information, there is a molding clamping pressure, an injection pressure, or the like.

The control device 20 generates operation command information OC using the sensing information SR sent from the molding machine main body 10 or using information prepared by the control device 20 in advance so that the molding machine main body 10 performs operations required for the processes such as the mold clamping process, the plasticization process, or the injection process, and sends the operation command information OC to each driving unit of the molding machine main body 10. Each driving unit of the molding machine main body 10 performs operations required for performing the injection molding, based on the received operation command information OC.

The control device 20 includes a processing unit 20a and a storage unit 20b (control unit), and the processing unit 20a reads various information stored in the storage unit 20b according to instruction and selection from a user and displays the information on the display unit 29.

The operation command information OC is generated in the control device 20 based on various set values, selection of an operation, selection of a display image, or the like which is input to the control device 20 by the user operating the injection molding machine 1. Here, the "input" includes an action which selects specific information from a menu.

The control device 20 includes a man-machine interface 21, and a worker inputs various information to the control device 20 via the man-machine interface 21. The man-machine interface 21 includes various switch buttons 23, a soft and hard key input unit 25, and a touch panel 27.

As the switch button 23, there are various switches such as a switch for turning on and off a power source of the control device 20, a switch for turning on and off a power source of the molding machine main body 10, a tiltable switch for selecting movement and a movement direction of a device, or a switch in which a lamp is lit, made to flicker, or extinguished by turning on and off a switch.

In addition, the switch buttons 23 may be provided so as to correspond to various operations of the molding machine main body 10. For example, a switch button 23 corresponding to the molding clamping process, a switch button 23 corresponding to the injection processing, or the like may be provided. In this case, the switch button 23 may be configured to include a menu button.

The key input unit 25 allows selection of the above-described processes, input of a set value required for performing the selected process, or selection of information displayed on the display unit 29. A keyboard of a computer device including keys corresponding to an alphabet and numeric keypads corresponding to numbers of 0 to 9 may be used as the key input unit 25, and a keyboard which is developed on a touch panel may be also used as the key input unit 25. Information input from the key input unit 25 is sent to the control device 20.

The touch panel 27 includes a touch information detection unit 28 (hereinafter, referred to as a detection unit 28) and a display unit 29, and is a device in which the detection unit 28 specifies a position of a touched area when the surface of the display unit 29 is pressed (touched), and which can perform operations corresponding to the touched area and has both a function of a display device and a function for allowing input.

Figure 1:
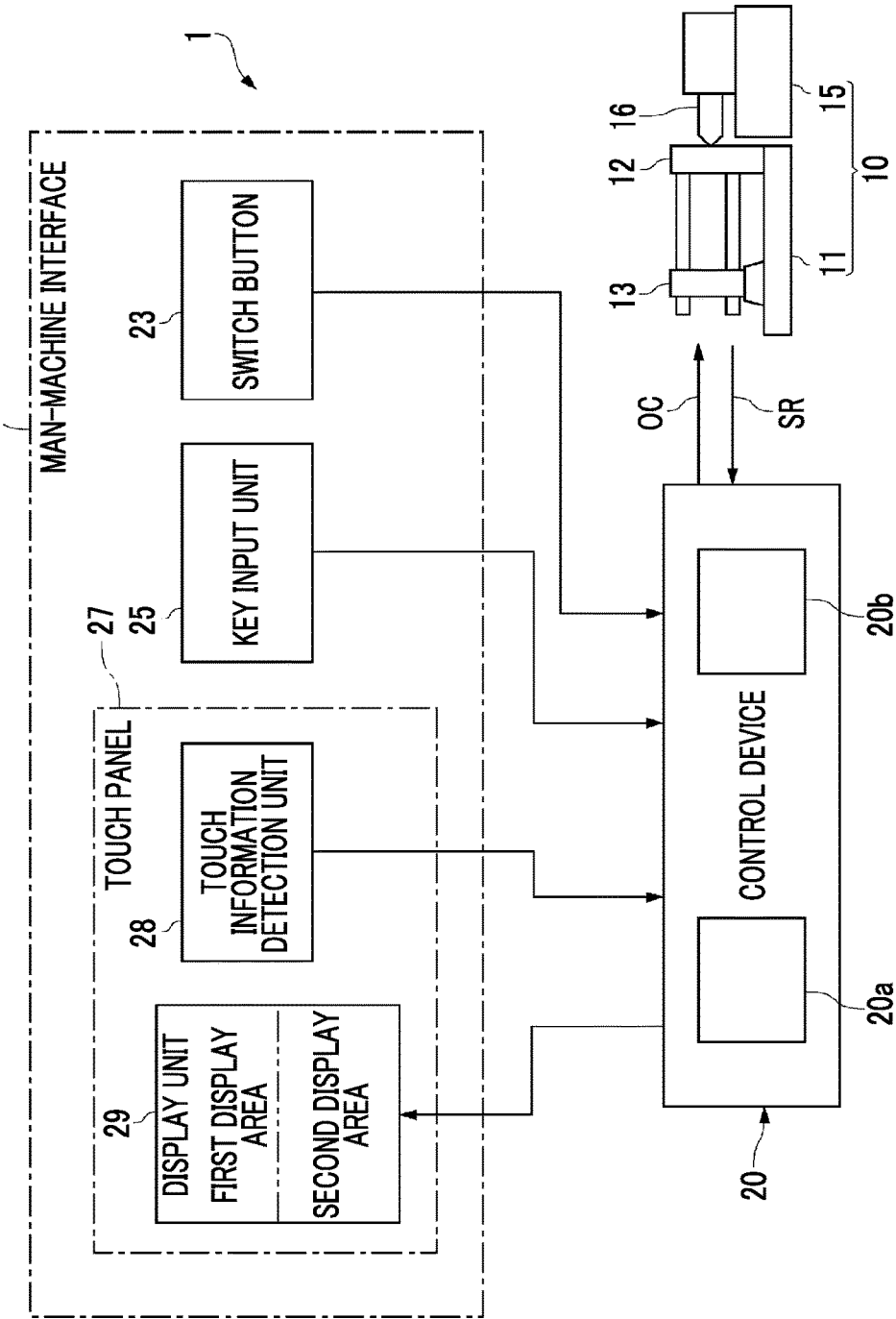
FIG. 1 is a block diagram showing a configuration outline of an injection molding machine in the present embodiment.
Figure 2:
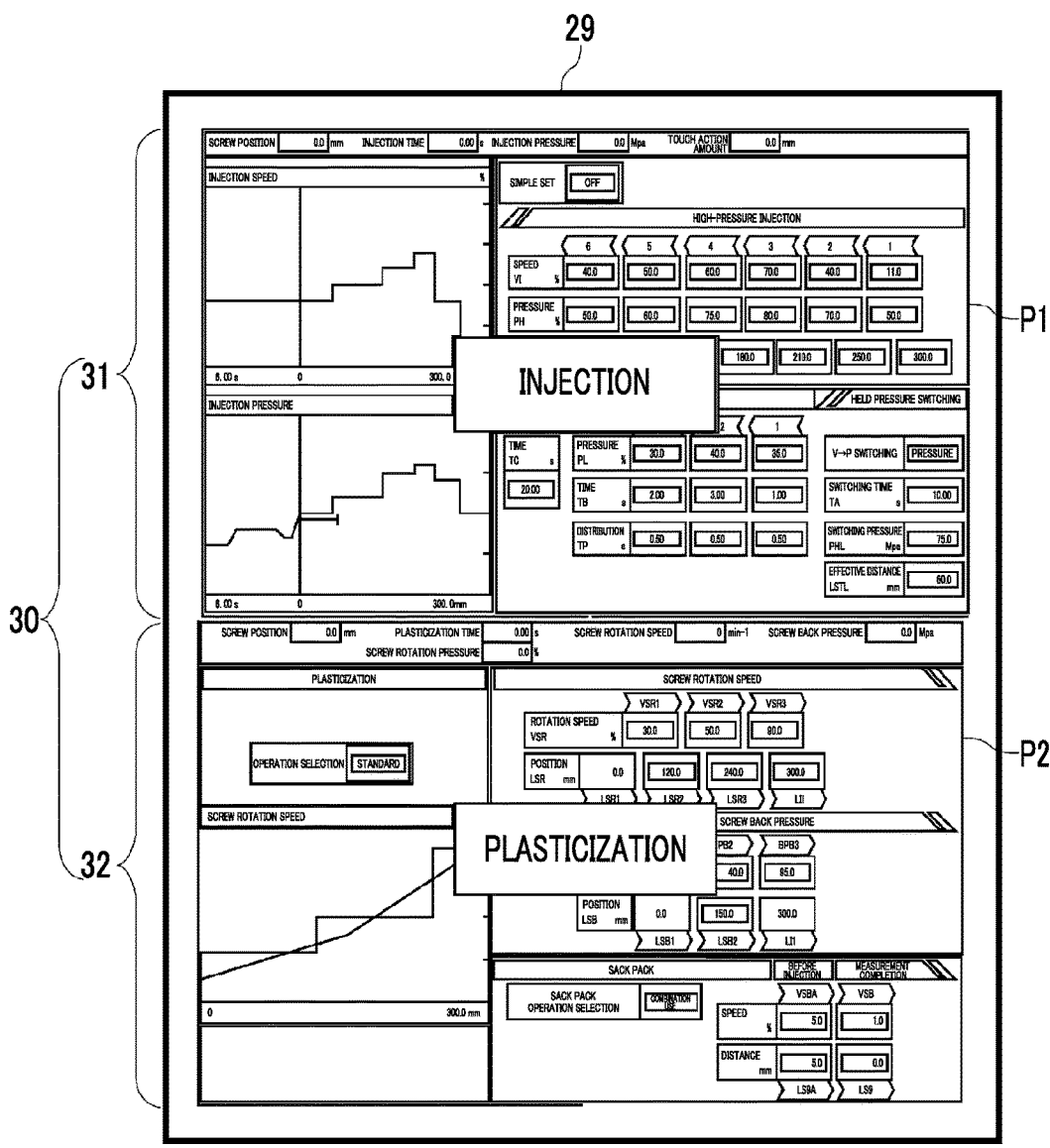
FIG. 2 is a diagram showing an example displayed on a display unit.

As shown in FIG. 2, the display unit 29 includes a vertically long entire display area 30, and one integral piece of information (single display image) can be displayed on the entire display area 30. In addition, the display unit 29 can display each of two different display images on a first display area 31 and a second display area 32 which are obtained by vertically dividing the entire display area 30 into two equal parts. In this way, the display unit 29 includes a standard display mode in which a different single display image is displayed on each of the first display area 31 and the second display area 32, and an extension display mode in which a single display image is displayed on the entire display area 30. In the display unit 29, selective switching is performed between the standard display mode and the extension display mode, and the display image can be displayed thereon. FIG. 2 shows an example of the standard display mode. However, in the control device 20 of the present embodiment the standard display mode is set as a default. Here, the defaults of all display images may not be set to the standard display mode, and the default display of each display image may be selectively set to the standard display mode or the extension display mode. For example, the defaults of the setting screens such as for the mold clamping process, the injection process, or the plasticization process may be set to the standard display mode, and the default of the data display screen such as a trend list may be set to the extension display mode.

In the display unit 29, in order to select the display image, as shown in FIGS. 12 and 13, menu buttons may be displayed. For example, a button for selecting the setting image of the injection process, a button for selecting the setting image of the mold clamping process, or the like is displayed, and the user can select the setting image. For example, as shown in FIG. 12, the menu buttons may be a two-step menu button in which when an arbitrary button (Temp) from the first selection button list L1 is touched and selected according to a category name, a second selection button list L2 in which the display images of each category can be selected is displayed. In this case, as shown in FIG. 12, the second selection button list L2 may be displayed above the first selection button list L1, and the second selection button list L2 may be displayed so as to overwrite the first selection button list L1 at the same position as the first selection button list L1. In addition, as shown FIG. 13, the menu buttons may be menu buttons in which all categories C1 and display images C2 of each category can be listed. The hierarchies of the menu buttons are not limited to two hierarchies and there may be three hierarchies or more.

Figure 3:
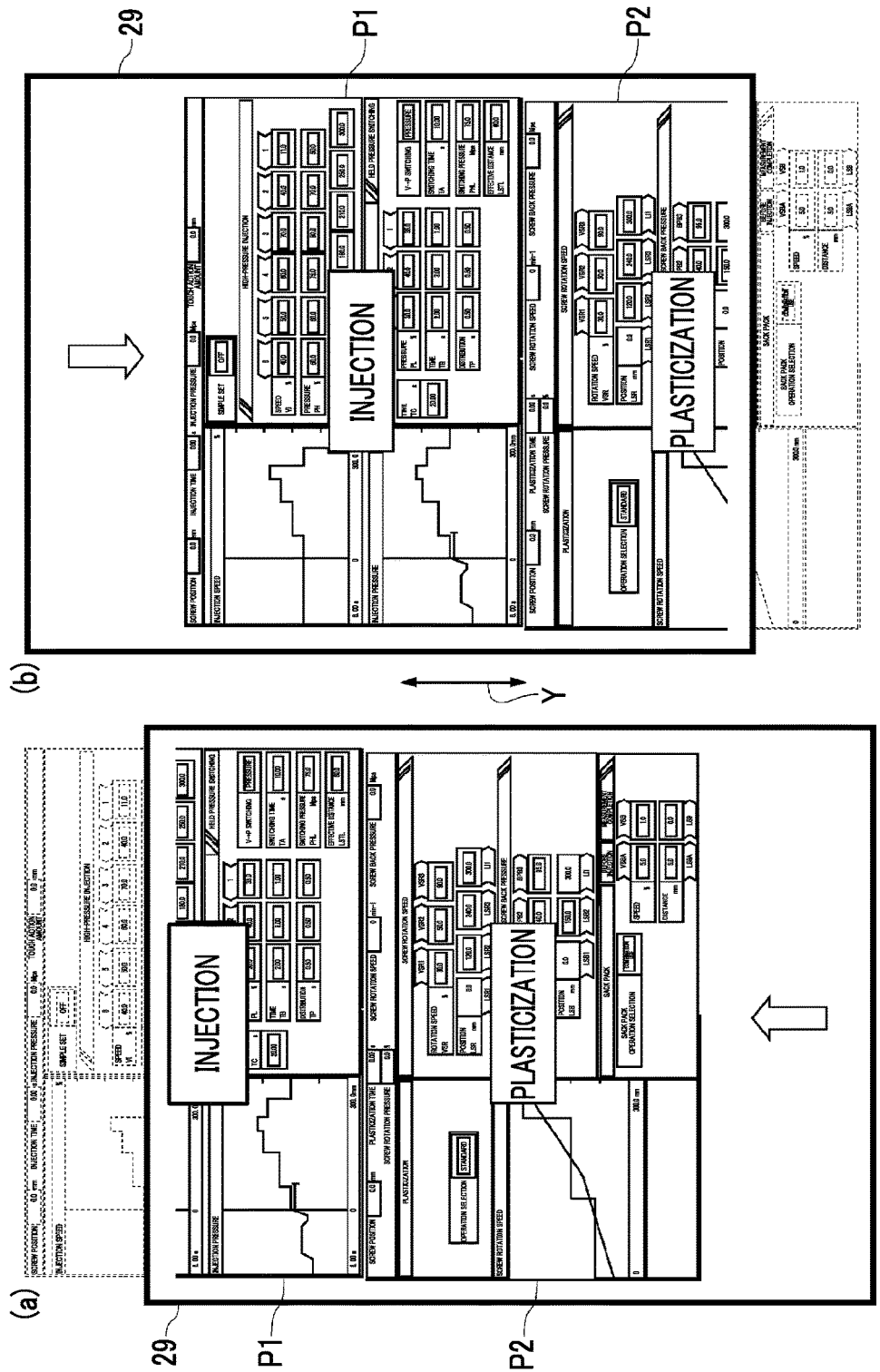
FIG. 3 is a diagram showing an example of a scrolling by which two screens become interlocked with each other.

In addition, as shown in the lowest layer of FIG. 13, the menu buttons of each user may be customized (refer to FIG. 3). In this case, preferably, the ID is assigned to each user in advance, a storage area of the control device is allocated to each ID, menu buttons in which the display selection buttons of an operation screen group most frequently used by the user are collected are stored for each ID of an user, and the menu button are summoned by the user and can be displayed thereon. In general, a user selecting molding conditions has the user's own molding condition selection know-how, and the operation screens most frequently used by each user are different from each other. Accordingly, the menu buttons for each user are customized, and the number of menu display items of select screens is decreased. Therefore, the user can reduce time for performing button position identification and a button selection operation on the display screen, and operating efficiency effectively increases. Moreover, processing by which the menu buttons for each user are customized may be automated. Specifically, the setting screen which is frequently used by each user is learned by the control device 20, the menu buttons are automatically selected for each ID, and the menu buttons are customized and may be stored in the storage unit 20b. In addition, the customized menu buttons may be not inherent for each ID, and may be shared with a plurality of predetermined IDs. In this case, a shared password may be provided, and passwords of each ID are managed as a group and may be used in common with the menu buttons. In addition, it is possible to summon the customized menu buttons stored in the storage unit 20b, and to perform editing such as addition or removal on the customized menu buttons. In this case, a user capable of performing the editing is limited to all users having IDs by which the menu buttons can be shared, or is limited only to an owner having the ID which is registered as a person capable of performing the editing in advance. However, for security, preferably, an user is limited only to the user having the ID which is registered as a person capable of performing the editing in advance.

In addition, preferably, the menu buttons in which the display selection buttons of the operation screens of each mold or each target molded part are collected is stored, and the menu buttons are summoned so as to be displayed. In general, operation parameters of the molding machine greatly influencing high quality molding are different from each other in each mold or each molded part. Accordingly, the menu buttons are customized to the setting screens including parameters greatly influencing each mold or each molded part, the selection time of the user on the display screen is reduced by decreasing the number of menu display items of the select screen, and it is possible to effectively increase the operating efficiency.

In addition, preferably, a plurality of menu buttons are stored in the same ID. In this case, when the control device 20 identifies the ID of the user after the control device 20 reads the molding conditions of a predetermined mold or molded part, the control device 20 collates the ID of the user with the mold or the management number of the molded part, and the user reads the menu list of the operation screen in which the user has been mainly used with respect to the mold or the molded part from the storage unit 20b and prepares the menu list so as to display the menu list on the display unit 29. In addition, this is similarly applied to a case where the control device 20 reads the molding conditions of a predetermined mold or molded part after the control device 20 identifies the ID of the user. In a case where operation screens having increased operating efficiency for each user are different from each other when the molded parts are different from each other, each user easily selects the molding conditions independently. In addition, it is possible to always summon the menu buttons of the operation screen, which is considered to be preferable for each target molded part by the user, from the storage unit 20, and it is possible to increase workability.

Moreover, preferably, after the menu buttons of each ID of the operation screen registered on the storage unit 20b in advance, or the menu buttons of each management number of the mold or a product is read, the menu buttons are edited, the edited menu buttons may be stored in the storage unit 20b so as to be updated. In this case, when the menu buttons are improved so that the user more easily uses the menu buttons, the menu buttons of the latest operation screen can always be summoned, and it is possible to effectively increase workability.

Moreover, the storage unit 20b of the customized menu buttons may be provided on the control device 20 of the injection molding machine 1, and may be provided on a centralized management device (not shown) which manages a plurality of injection molding machines in a centralized manner. In the case where the storage unit 20 is provided on the centralized management device, irrespective of which injection molding machine which is managed by the centralized management device, a user can use the their own customized menu buttons. Accordingly, it is not necessary to customize the menu button for each injection molding machine so as to be stored in the storage unit, and it is possible to increase the operating efficiency.

In addition, even when the storage unit 20b of the customized menu button are provided on the control device 20 of the injection molding machine 1, a plurality of control devices for injection molding machines are connected to each other by communication, and the customized menu buttons may be summoned from the mutual storage devices so as to be shared. Specifically, a control device for an injection molding machine (referred to as a control device A) identifying the ID of the user searches to find another control device for an injection molding machine (referred to as a control device B) which stores the menu buttons customized by the user. The control device A receives the menu buttons with respect to the ID of the user via communication from the control device B, and may display the menu buttons on the display device of the control device A.

The display unit 29 displays the image corresponding to the input (selection) from the menu buttons, the key input unit 25, or the like which is displayed on the display unit 29. The information related to the display image is held in the storage unit 20b (hereinafter, may be referred to as a data storage unit 20b) of the control device 20, and is read from the data storage unit 20b according to the selection of the user so as to be displayed on the display unit 29. For example, in FIG. 2, the setting image of the injection process is displayed on the first display area 31, and the setting image of the plasticization process is displayed on the second display area 32. The selected setting images are stored in the storage unit 20b as the display history if there is no instruction to erase the selection and the display history. The display history is not limited to the setting images, and information read from the storage unit 20b such as trend data described below is stored in the storage unit 20b in the display history.

When two display images are displayed, in the display unit 29, the display image required to be displayed first is displayed on the first display area 31, and the display image required to be displayed thereafter is displayed on the second display area 32. That is, in the present embodiment, the display image having an older position in the display history is displayed on the first display area 31 positioned on the upper side, and the display images having a newer position in the display history are displayed on the second display area 32 positioned on the lower side. However, the positions of these areas may be exchanged between the upper side and the lower side. For example, in a step in which the setting image of only the injection process is not read, the first display area 31 may be a blank screen. In addition, a default image may be set in advance, and the default image may be automatically displayed on the first display area 31 and the second display area 32 of the display unit 29 as an initial screen after power sources inputs power. Here, for simple description, the case where the first display area 31 is a blank screen as the initial screen is described. However, for example, when the setting image of the plasticization process is read, the setting image of the injection process is displayed on the blank first display area 31, and the setting image of the plasticization process is displayed on the second display area 32. Alternatively, in a step in which the setting image of only the injection process is not read, the setting image of the injection process may be displayed on the first display area 31, and the second display area 32 may be a blank screen. In this case, for example, when the setting image of the plasticization process is read, the setting image of the plasticization process is displayed on the blank second display area 32 in the state where the setting image of the injection process is displayed on the first display area 31.

The setting images of the injection process are hierarchized, the setting image displayed on the first display area 31 of FIG. 2 corresponds to the uppermost area, and the setting image which is not shown in FIG. 2 and positioned on the lower side is present. The setting image positioned on the lower side is read from the data storage unit 20b according to the input and the selection of the menu buttons, and is displayed on the display unit 29. The setting image positioned on the lower side may be displayed on the second display area 32. However, another display method of the display unit 29 when the display image positioned on the lower side with respect to the uppermost display image is read will be described below. Here, the case in which the setting image of the injection process is hierarchized is described. However, during other processes such as the mold clamping process or the plasticization process, the setting image may be hierarchized. The number of hierarchies may be arbitrary, and two or more arbitrary hierarchies may be configured with respect to each process. There may be a process which does not include lower hierarchy.

The display unit 29 of the present embodiment includes the standard display mode in which each of display images different from each other is displayed on each of the first display area 31 and the second display area 32. However, in a state where a relative positional relationship between image information (hereinafter, may be referred to as a first display image P1) displayed on the first display area 31 and image information (hereinafter, may be referred to as a second display image P2) displayed on the second display area 32 is maintained, it is possible to synchronously scroll the first display image P1 and the second display image P2. Hereinafter, with reference to FIGS. 2 and 3, a synchronous scrolling which is a characteristic of the present embodiment will be described. Moreover, the scrolling of the present embodiment means that the display histories of the plurality of image information items stored in the storage unit 20b are displayed on the display device so as to be switched to each other in this order. In addition, the display method includes the well-known method of sliding the images displayed on the display device in one direction (typically, vertically or horizontally) by a scroll instruction according to the operation of the user, that is, of continuously moving the images so as to display the images. In addition, the display method includes the well-known method such as a static switching display of displaying the image on the second display area adjacent to the first display area after temporarily erasing the displayed images from display areas, for example, the first display area without performing the dynamic display of sliding the image.

[Synchronous Scroll Function (FIGS. 2 and 3)]

In the standard display mode as shown in FIG. 2, the first display image P1 (for example, the setting image of the injection process) and the second display image P2 (for example, the setting image of the plasticization process) are displayed. Moreover, the entirety of the first display image P1 is displayed on the first display area 31, and the entirety of the second display image P2 is displayed on the second display area 32. Moreover, in the present embodiment, the case in which the first display area 31 is disposed on the upper side of the display unit 29 and the second display area 32 is disposed on the lower side of the display unit 29 is described. However, the first display area 31 may be disposed on the lower side of the display unit 29, and the second display area 32 may be disposed on the upper side of the display unit 29.

For example, when an instruction for scrolling the displayed image is input to the key input unit 25, as shown in FIG. 3(a) or 3(b), the first display image P1 and the second display image P2 are synchronously scrolled in the state where a relative positional relationship between both is maintained. According to the scroll instruction, as shown in FIG. 3(a), the scrolling can be performed upward in a vertical direction Y of the vertically long display unit 29, and as shown in FIG. 3(b), the scrolling can be performed downward in the vertical direction Y. In addition, a scroll speed may be set to well-known scroll speeds which are used in a personal computer, a smart phone, a tablet type computer, or the like. Moreover, the scroll speed may be set to a speed value according to the preference of an user. In addition, when the scrolling slides the display image and the display image is displayed dynamically, the scrolling may be stopped and the image may be displayed in the state where the display image is not displayed on only a portion of the upper part or the lower part of each display image during the scrolling, at an arbitrary position according to a scroll stopping instruction of the user such as a case where the user stops the scroll operation during the switching of the screen. Of course, it is needless to say that the setting input can be performed even in the state where the scrolling is stopped at an arbitrary position.

For easy understanding, in FIG. 3, the lower side (FIG. 3(a)) in the display unit 29 and the upper side (FIG. 3(b)) in the display unit 29 are empty. However, if setting images (for example, the mold clamping process) other than the setting images of the injection process and the plasticization process are previously selected, the setting image of the mold clamping process is displayed on the empty portion. Moreover, the direction of the scrolling is indicated by void arrows, and hereinafter, this is similarly applied. In addition, the outline of the image protruding from the display unit 29 using the scrolling is shown by dotted lines. However, the image cannot be viewed in reality.

According to the present embodiment, when the scroll instruction is applied to the first display image displayed on the first display area 31 and the second display image displayed on the second display area 32, two display images vertically adjacent to each other can be vertically scrolled and displayed in the state where two display images are synchronized and connected to each other. Therefore, according to the present embodiment, when the display image (previously displayed image) which is not displayed at the present time is required to be redisplayed, it is possible to display the previously displayed image by simply performing the scroll instruction. Accordingly, in the present embodiment, since work such as in a case where a user must remember the name of the previously displayed image while depending on the user's memory or the user selects the previously displayed image from the menu screen again is not required, it is possible to reduce a load on the user.

Moreover, in the present embodiment, since the setting images can be scrolled and displayed in the order as in the operation history and the screen selection history, if an user has displayed the image, even when the user's memory is unreliable and the user does not remember the hierarchy, it is possible to display the image which is not displayed at the present time by simply performing the scrolling. Therefore, it is possible to reduce the operation time and increase productivity.

In addition, since the display unit 29 is divided into the first display area 31 and the second display area 32 and the first display image and the second display image are simultaneously displayed, the setting screens of other processes are not displayed in a reduced form or are not partially displayed, the setting screens are displayed on the entire screen, and the user can input conditions while checking all setting values on the screen. Accordingly, it is possible to input and change the setting values while reviewing the setting values closely related to each other in a series of mechanical operations even if the mechanical operations are different from each other. Accordingly, unlike a method in which one display image is displayed on one display area, labor in which the user switches the display images one by one and checks the display images, or labor in which the user identifies small characters which are difficult to see due to the reduction of the image, or labor in which the user switches the image to other portions of the same screen to display the image is removed, and it is possible to prevent input errors due to confusion in the user's memory or the user's misunderstanding.

In addition, since the display images are displayed on the first display area 31 and the second display area 32 according to the selected order, when the user sets the operation conditions of a machine, in a case where the user has a setting procedure according to the user's own know-how, it is possible to realize the disposition of the setting image according to the effective setting procedure set by the user. Therefore, according to the present embodiment, it is also possible to customize the display procedure with respect to the operation manner of each user. In this case, preferably, the ID is assigned to each user in advance, a storage area of the control device is allocated to each ID, and the connection procedure and the layout of the operation screens are stored for each ID of the user and are summoned so as to be displayed. In addition, preferably, the connection procedure and the layout of the operation screens are stored for each mold or each target molded part, and are summoned so as to be displayed. In addition, preferably, if the connection procedures and the layouts of a plurality of operation screens can be stored in the same ID, when the preferable layout having high operating efficiency for setting screens is changed depending on the target molded part or the like, the connection procedure and the layout of the preferable operation screen of each target molded part can always be summoned from the storage unit 20b.

Moreover, customization processing of the layout may be performed by an operation of the user of storing the setting image, which is actually displayed when the user selects the molding conditions, and the display history in the storage unit 20b, or may be performed by an operation of providing a dedicated customization processing screen, allowing the user to select the setting screen on the dedicated screen, to set the layout, and to perform the customization, and storing the customization in the storage unit 20b. Alternatively, the setting images which are frequently used by the user and the display procedures are learned by the control device 20, and the control device 20 automatically set the layout of each ID, and store the layout in the storage unit 20b.

Moreover, preferably, after the connection procedure and the layout of the operation screen registered in the storage unit 20b in advance are read and edited, the connection procedure and the layout of the edited operation screen are updated and stored in the storage unit 20b. In this case, when the connection procedure and the layout are improved so that the user easily uses the connection procedure and the layout, since the connection procedure and the layout of the latest operation screen can always be summoned, it is possible to effectively increase workability. In addition, it is needless to say that the menu buttons of each ID of the operation screen registered in the storage unit 20b in advance, or each management number of the mold or the product is read and edited, and may be stored as a menu different from the read menu.

In addition, according to the user's memory such as "has displayed before . . . ", since the display procedure of the screen can be intuitively reflected in an operation, the operation can be performed according to the image of the user, and it is possible to reduce stress on the user during the operation. In addition, in order to rapidly display a desired image which has been displayed before a plurality of pages, the scroll amount may be specified by a number such as the number of pages, and the image may be switched by jumping to a desired image. Moreover, the scroll speed may be set so as to be switched in a plurality of steps in advance, and the scroll speed is switched to a desired scroll speed by directly selecting the desired scroll speed or the scroll speed may be automatically switched to the desired scroll speed by a predetermined touch action. In addition, a text search function or a code search function is provided in the control device 20 in advance, and when a keyword of a desired screen or the cord is searched for, the desired screen can be displayed.

The scroll may be performed by pressing soft switches or hard switches such as sheet keys on the touch panel, and may be performed by a touch action operation of moving the image in the scroll direction while touching the touch panel, that is, a so-called swipe operation. Alternatively, the scroll instruction may be performed using a method by which the instruction in the scroll direction is acoustically recognized according to voice of the user.

In addition, switching between a method of displaying a new setting image by inserting the new setting image from above the display unit 29 and scrolling the image downward and a method of displaying the new setting image by inserting the new setting image from below the display unit 29 and scrolling the image upward can be selectively set according to the user's own convenience. Accordingly, since the scroll direction matching the image of the user can be selected, that is, the display switching can be tailored for a user using an image which is viewed by scrolling down a new image from the history, or a user using an image which is viewed by scrolling up a new image from the history, it is possible to remove inconvenience such as misunderstanding or discomfort.

[Switching Between Standard Display and Extension Display (FIG. 4)]

As described above, the present embodiment includes the standard display mode and the extension display mode. However, hereinafter, with reference to FIG. 4, effective use aspects of switching from the standard display mode to the extension display mode, or switching from the extension display mode to the standard display mode will be described.

Figure 4:
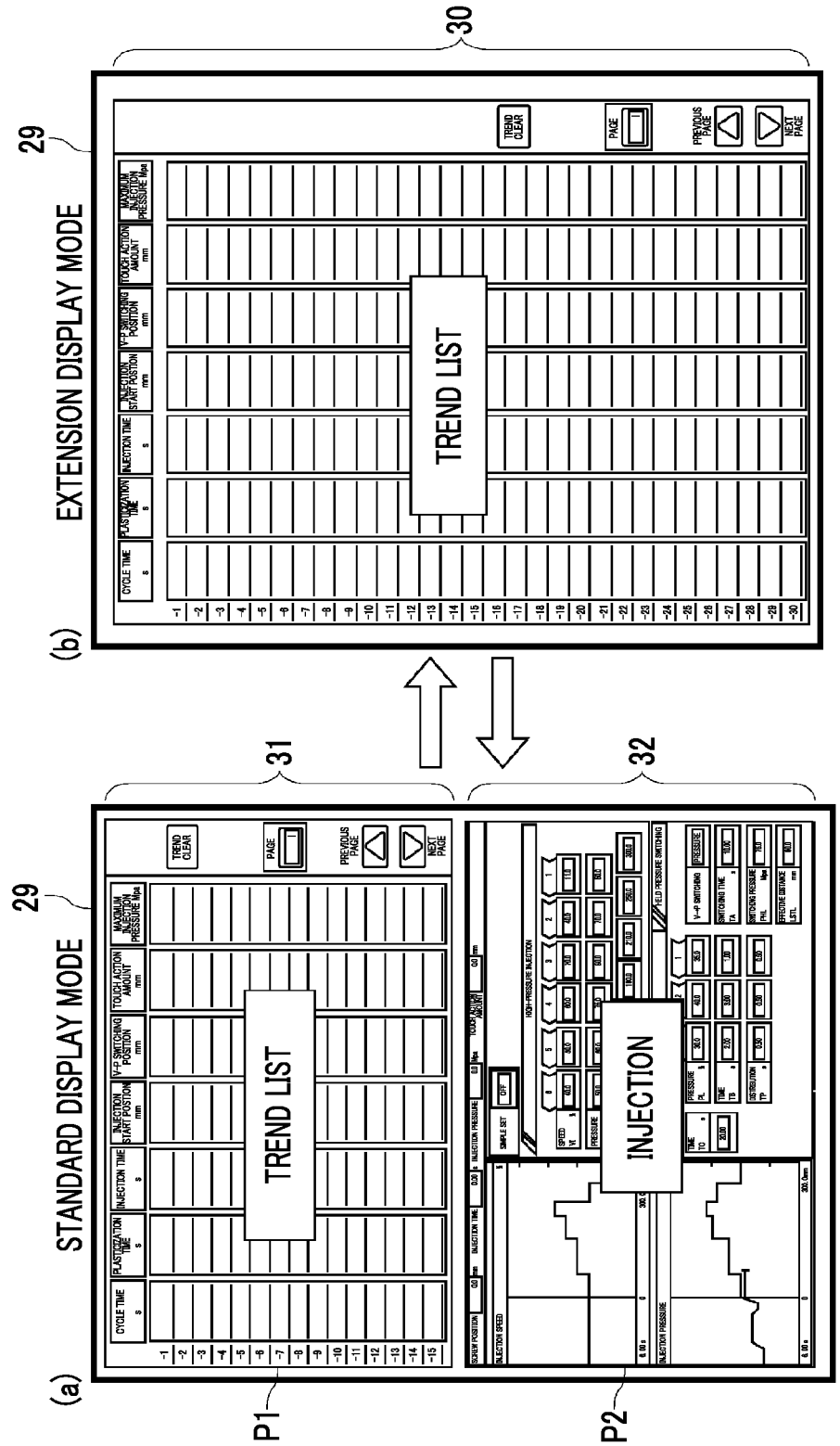
FIG. 4(a) shows an example in which two different display images are displayed on two display areas so as to divide the display unit.
FIG. 4(b) shows an example in which one display image is displayed on the entire area of the display unit.

In FIG. 4(*a*), each of the first display image P1 and the second display image P2 is displayed on each of the first display area 31 and the second display area 32 according to the standard display mode. In this example, the second display image P2 indicates the setting image of the injection process, and the first display image P1 indicates a trend list with respect to the injection molding machine 1. The trend list is list type data in which a history of the conditions used in the injection molding of the past is listed. For example, the data includes a cycling time of injection, a plasticization time, an injection time, an injection start position, or the like. With reference to the data, the user can evaluate molding stability of the operation of the injection molding machine, presence or absence of an abnormal state, stability of the molded part, whether or not molding failure could occur, abnormality of the molding machine, or the like. Accordingly, in order to set stable molding conditions, for example, when the user performs the setting with respect to the injection process, the user can input conditions considered appropriately to the setting image displayed on the second display image P2 with reference to the data.

In the trend data, the operation data of a molding cycle of the past is listed as the history of each molding cycle, and if many molding cycles overlap each other, the data which cannot be completely received in the first display area 31 by the standard display mode occurs, and the data is hidden in FIG. 4(*a*). The user may want to refer to the history data of the hidden portion. Accordingly, in the present embodiment, as shown in FIG. 4(*b*), the trend data can be displayed over the entire display area 30. That is, in the present embodiment, the trend data displayed in the standard display mode can be displayed so as to be switched to the extension display mode. Specifically, it is possible to display approximately twice as many items than the trend data items displayed on only the first display area 31 by displaying the trend data over the entire display area 30. The user extracts the required conditions of the injection process with reference to the trend data displayed in the extension display mode, and can effectively use the extracted conditions to set the injection process. When the extraction of the conditions ends, as shown in FIG. 4(*a*), the extension display mode is returned to the standard display mode and the conditions are input by the user.

In a display image group having the hierarchical configuration in which there is a lower display image with respect to an upper display image, the upper image is displayed on the first display area 31 or the second display area 32. In this case, when there is an instruction of the user to display the extension display mode on the upper display image, a pair of display images in which the upper display image is disposed in the first display area 31 and the lower display image is disposed in the second display area 32 may be display of a hierarchical configuration.

In addition, conversely, when the lower display image is displayed in the first display area 31 or the second display area 32, in a case where there is an instruction of the user to display the extension display mode on the lower display image, a pair of display images in which the upper display image is disposed in the first display area 31 and the lower display image is disposed in the second display area 32 may be display of a hierarchical configuration.

The switching from the standard display mode to the extension display mode and the return (switching) from the extension display mode to the standard display mode are performed according to the instruction of the user. This instruction may be any instruction. For example, it may be assumed that the instruction is input from the key input unit 25 in which the area (in the present embodiment, the first display area 31 in which the trend data is displayed) in which the image required to be set to the extension display mode is displayed is touched by the user.

Moreover, in order to prevent incorrect display of the display image, the display images in which the extension display mode can be used may be limited to images of only the data list such as a trend data list or a control signal list.

[Automatic Insertion and Scroll Function of New Selection Image Information (FIG. 5)]

Next, automatic insertion and a scroll function of new selection image information which are other characteristic display methods of the present embodiment will be described.

Figure 5:
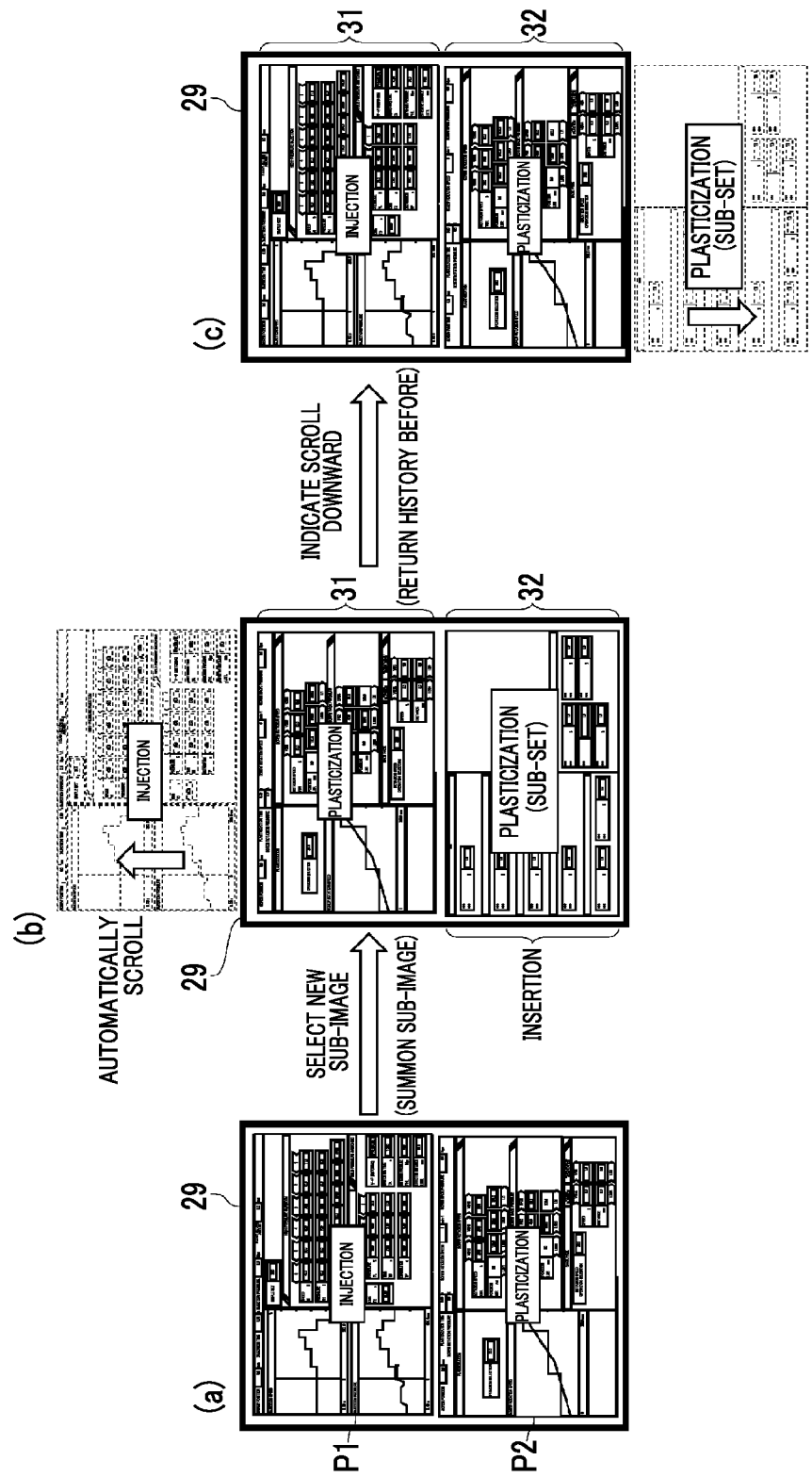
FIG. 5 shows an example in which a new selected display image is displayed on the display unit, (a) shows a display example before new selection is performed, (b) shows an example in which the new selected display image is displayed on the display unit, and (c) shows an example in which the scrolling is performed after the new display image is selected.

For example, as shown in FIG. 5(*a*), in a state where the setting image of the injection process is displayed as the first display image P1, and a plasticization main setting image (hereinafter, referred to as a main setting image) in which the main setting condition values of the plasticization process are displayed is displayed as the second display image P2, a plasticization sub-setting image (hereinafter, referred to as sub-setting image) is selected, in which input columns of subsidiary condition values of the plasticization process positioned at a hierarchy lower than the second display image P2 are disposed. Moreover, the new setting images may be setting images which are not the sub-setting images such as the images of the mold clamping process. However, the present embodiment is described using the plasticization sub-setting image.

As shown in FIG. 5(b), the control device 20 displays the sub-setting image on the second display area 32, and the main setting image, which has been displayed on the second display area 32 as the second display image P2 until the sub-setting image is displayed on the second display area 32, is automatically scrolled upward toward the first display area 31. Moreover, in the present embodiment, the example in which the image having the older position in the display history is displayed on the upper side of the display unit 29 and the new image is displayed on the lower side of the display unit 29 is described. However, the images having the older positions in the display history are displayed on the lower side of the display unit 29 and the new image is inserted so as to be displayed on the upper side of the display unit 29. The main setting image is the first display image P1, and the sub-setting image is the second display image P2. Simultaneously, the setting image of the injection process, which is the first display image P1 which has been displayed on the first display area 31 until that time, is automatically scrolled upward, is made to disappear from the display unit 29, and the display of the setting image of the injection process is interrupted. However, the display history in which the setting image of the injection process is displayed to be adjacent to the upper side of the main setting image is stored in the storage unit 20b.

When the user ends the conditions input required for the sub-setting image and redisplays the setting image of the initial injection process and the initial main setting image, both images are synchronized so as to be scrolled downward by the instruction of the user and are displayed on the first display area 31 and the second display area 32 as shown in FIG. 5(c). The sub-setting image which has been displayed until that time is scrolled downward and is made to disappear from the display unit 29. However, the display history in which the sub-setting image is displayed so as to be adjacent to the lower side of the main setting image is stored in the storage unit 20b.

In addition, in this case, when the user want to perform the setting operation according to the new setting images while viewing the main setting image of the plasticization in the state in which the sub-setting image is made to disappear downward, for example, when the user selects the setting image of the molding clamping process and displays the setting image, the main setting image is displayed as the first display image P1 displayed on the upper side of the display unit 29, and the setting image of the mold clamping process is displayed as the second display image P2. In this case, in the display history stored in the storage unit 20b, the setting image of the mold clamping process is inserted between the main setting image and the sub-setting image. Accordingly, if the user performs the upward scroll operation in the state where the main setting image is displayed as the first display image P1 and the setting image of the molding clamping process is displayed as the second display image P2, the first display image P1 is displayed on the setting screen of the mold clamping process, and the sub-setting image is displayed as the second display image P2.

According to the insertion method of the new selection image of the present embodiment, the setting image newly selected at an arbitrary position in the display history is displayed so as to be adjacent to the setting image positioned at a position above an arbitrary position, and the old setting image in the display history can be automatically removed from the display unit 29. Accordingly, the images which are required to be certainly displayed by the user at the present time are simultaneously displayed without performing the operation in which the user instructs the scrolling, and it is possible to rapidly perform the setting operation of the conditions. Therefore, it is possible to reduce an operation load on the user.

The insertion method of the new selection image of the present embodiment may be also applied to a case in which the new display image is required to be displayed when the old display image in the display history is displayed in the extension display mode. Accordingly, the new display image is displayed in the extension display mode, and it is possible to interrupt the display of the old display image (extension display mode) in the display history.

In addition, when the display images having the older positions in the display history are displayed in the extension display mode, if there is a request for displaying the new display image, the display images having the older positions in the display history are redisplayed in the standard display mode, the new display image is displayed in the standard display mode, and the new display image may be displayed above or below the display image having the older position in the display history according to an anteroposterior relationship in the display history.

In addition, the display images having the older positions in the display history are displayed in the standard display mode, when it is required to display the new display image in which a default display mode is the extension display mode, the display images having the older positions in the display history displayed in the standard display mode slides upward or downward, and the new display images may be displayed in the extension display mode.

Figure 6:
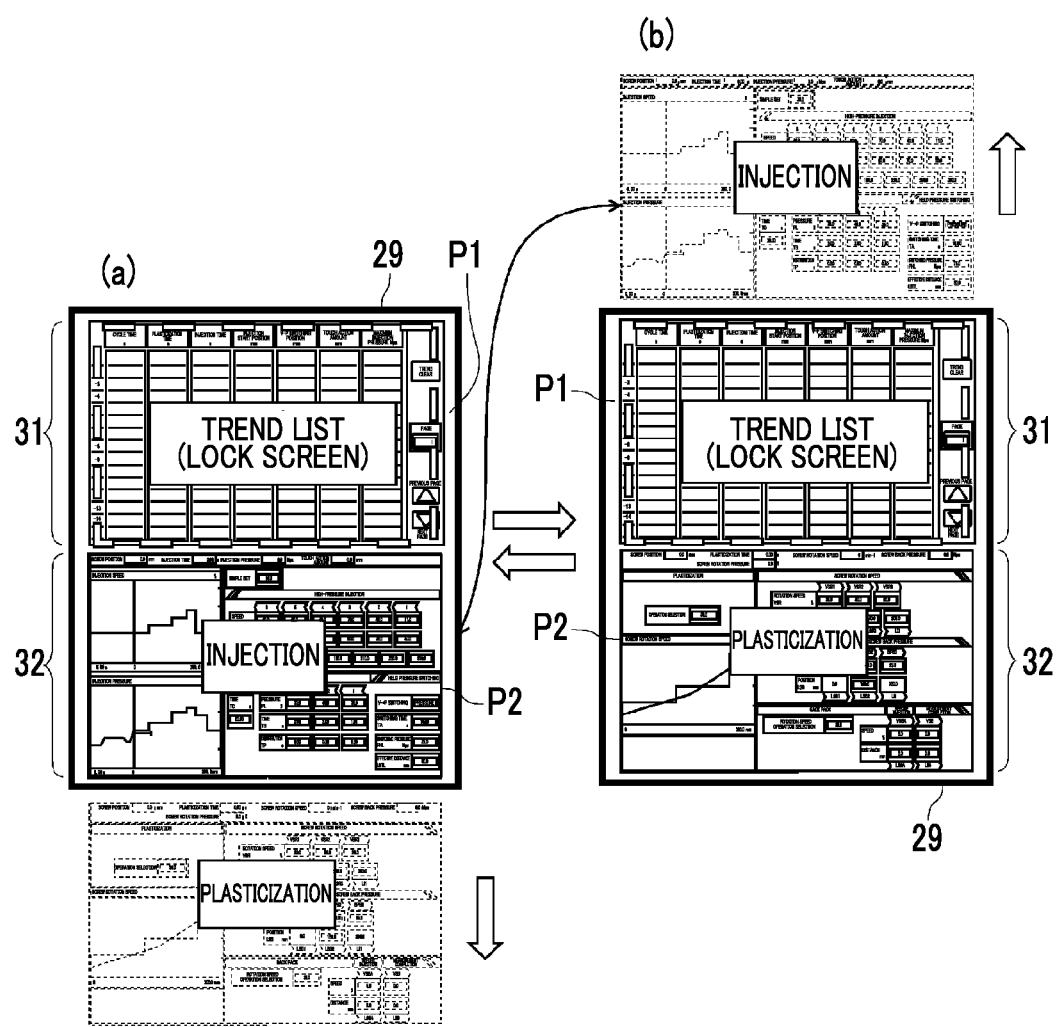
FIG. 6 shows an example in which the scrolling of one display image of two display images is locked, (a) shows the locked state, and (b) shows a display example when the scrolling is performed in the locked state.

[Scroll Lock Function of Display Image (FIG. 6)]

In the present embodiment, in principle, the image displayed on the first display area 31 and the image displayed on the second display area 32 are synchronized and scrolled. However, there is also an exception. The exception is a scroll lock function of the display image. As described below, this function is effective in a case where the conditions of the process which is effective in other high quality molding are set and input while referring to the operation setting of the process which becomes a center as the molding conditions by which different high quality molding is performed according to the trend list or the molded part.

For example, the trend list image, the setting image of the injection process, and the setting image of the plasticization process are previously selected, and as shown in FIG. 6(a), the trend list image is displayed on the first display area 31 as the first display image P1, and the setting image of the injection process is displayed on the second display area 32 as the second display image P2. The user inputs the setting image of the injection process as the image while referring to the trend list. In order to input the plasticization conditions after the input ends and display the setting image of the plasticization process on the second display area 32, in principle, the synchronization scroll is performed, and the trend list is made to disappear from the display unit 29. Since this is inconvenient for the user, the present embodiment includes the function locking the trend list image so that the trend list image displayed on the first display area 31 cannot be scrolled. Moreover, the display area, in which the image is locked so that the image cannot be scrolled, may be either the first display area 31 positioned on the upper side of the display unit 29 or the second display area 32 positioned on the lower side of the display unit 29. However, in the present embodiment the case where the image displayed on the first display area 31 is locked is described.

In the state in which the trend list image is locked, even when the user performs the operation of instructing the scrolling, as shown in FIG. 6(b), the state in which the trend list image is displayed on the first display area 31 is maintained. That is, until the lock function is released, the locked image is displayed so as to be always fixed to the locked display area. Meanwhile, the scroll instruction is applied to the display image of the injection process which has been displayed on the second display area 32 until that time and the hidden setting image of the plasticization process, the display image of the injection process is made to disappear from the upper portion of the display unit 29, and the setting image of the plasticization process is displayed so as to slide up from the lower end of the second display area 32. In this case, the display image of the injection process being stored in the display history means that the image is disposed to be adjacent to the upper side of the trend list so as to jump over the trend list image displayed on the first display area 31. That is, in this case, the image of the injection process may be stored as the image which has been displayed before the trend list in the display history. Accordingly, if the screen is scrolled downward in the state where the image lock of the trend list is released, the image of the injection process is displayed from above at the position adjacent to the upper side of the trend list. According to the lock function of the lock function of the scrolling, the user can input the conditions required for the setting image of the plasticization process while referring to the trend list image.

Moreover, when the first display image is displayed on the first display area, the second display image is displayed on the second display area, and one of the first display image and the second display image is locked, in a case in which the user performs locking of the other display image, the lock of the one display image which has been locked until now may be released. Specifically, for example, when locking of the second display image is performed in the state where the first display image is locked, the second display image is locked, and simultaneously, the lock state of the first display image may be released.

In addition, both the first display image and the second display image may be locked so as not to be scrollable. In this case, for example, it is possible to prevent the screen from being switched due to a portion of a body of the user or a portion of a member held by the user coming into contact with a scroll operation portion due to a mistake or the like of the user and an unintentional scroll operation being performed. Moreover, the scroll lock may be limited to being released by a specific user with a preset ID.

As described above, since the present embodiment includes the lock function of the scrolling, it is possible to set the conditions of two processes of the injection process and the plasticization process while always directly referring to the trend list, and it is possible to reduce the load of the setting operation of the user. In addition, the image to which the lock of the scrolling can be applied is not limited to the trend list, the lock can be applied to an arbitrary image laid out at an arbitrary position in other display histories, and other scrollable images in the state where one of arbitrary images is locked are not limited to the injection process and the plasticization process, and an arbitrary image can be scrolled.

[Name Display Function of Front and Rear Image Information (FIG. 7)]

Next, a function of displaying names of front and rear information which is not displayed on the display unit 29 will be described with reference to FIG. 7. This function supports user's unreliable memory.

Figure 7:
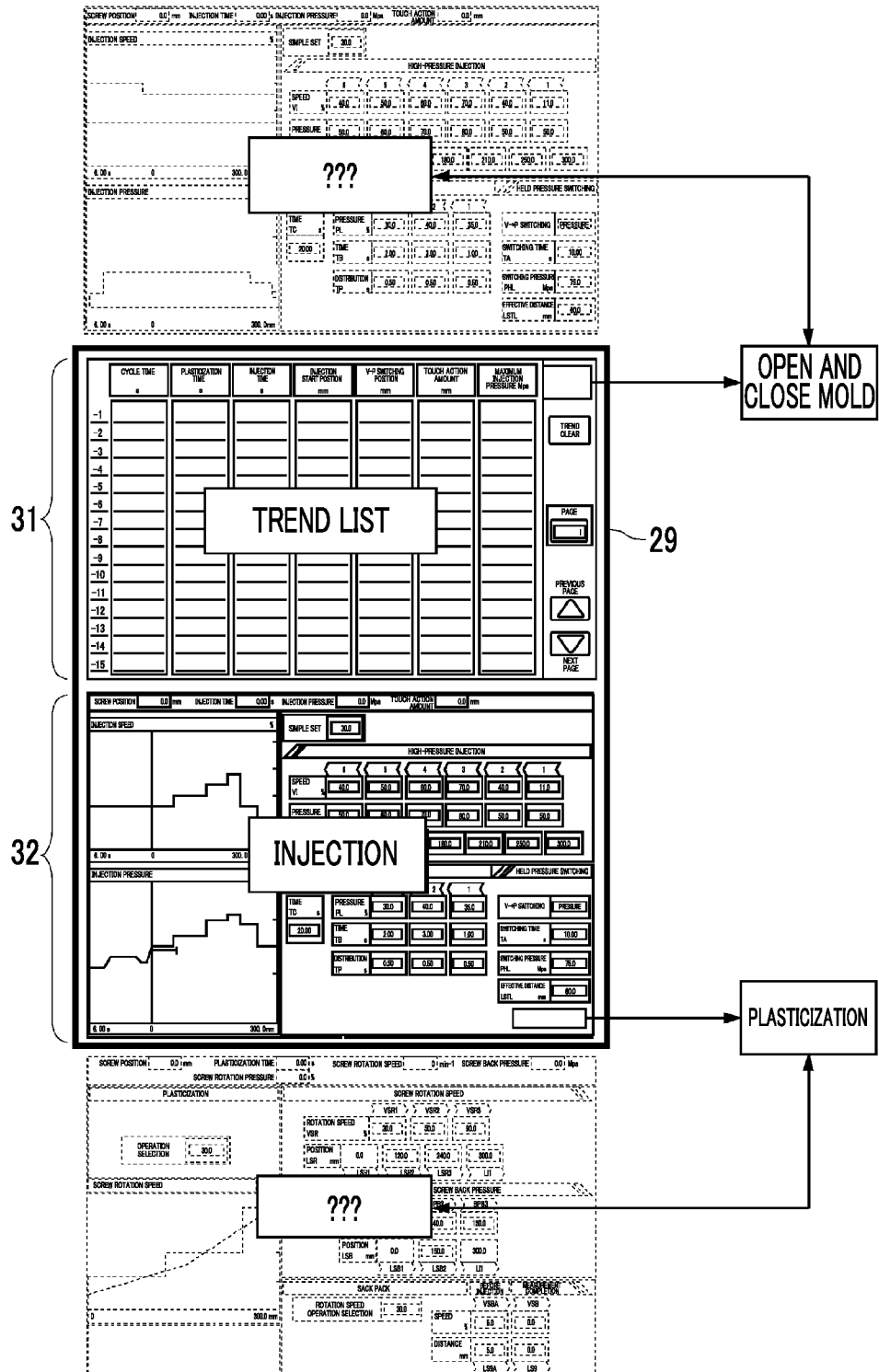
FIG. 7 shows an example in which names of the display images are displayed on the display unit immediately before and after.

For example, as shown in FIG. 7, the trend list image is displayed on the first display area 31, and the setting image of the injection process is displayed on the second display area 32. In addition, two display images are previously selected. However, the one display image has an older position in the display history than that of the trend list image and is hidden above the trend list image, and the other display image has the newer position in the display history than that of the setting image of the injection process and is hidden below the setting image of the injection process.

Even when a short time elapses after the user inputs the conditions with respect to the setting image of the injection process while referring to the trend list image, the user may forget the history. Accordingly, in the present embodiment, information capable of specifying the image information having the older position in the display history and the image information having the newer position in the display history which are not displayed at the present time, for example, names are displayed. In this example, a name such as a "mold opening and closing" is displayed on the first display area 31 as the image information having the older position in the display history, and a name such as "plasticization" is displayed on the second display area 32 as the image information of the new display history. The image information having the older position in the display history having the displayed name is older by one generation than the trend list image displayed on the first display area 31. In addition, the image information of the new display history having the displayed name is newer by one generation than the setting image of the injection process displayed on the second display area 32. Moreover, in the present embodiment, the names of the displayed images are the name of the image which is older by only one generation and the name of the image which is newer by only one generation. However, the names of the images which are older or newer by a plurality of generations, that is, one or more generations, for example, two generations, three generations, or the like may be displayed so as to be listed so that sequence of a display history can be understood. In this case, all the names of the images in a plurality of predetermined generations may be displayed from the beginning. However, in order to effectively use the limited display area such as displaying the setting input units of the operation conditions, preferably, initially, the name of the image which is older by only one generation is displayed, and the image names are displayed according to a multi-step type switching so that the image names of the plurality of predetermined generations are displayed by a predetermined operation.

As described above, according to the control device 20 including the name display function of the front and rear image information, with respect to an arbitrary image laid out at an arbitrary position in the display history, it is possible to recognize the image displayed before or after the image displayed at the present time, specifically, in the present embodiment, the setting image of the "plasticization" or the setting image of the "mold opening and closing". Therefore, according to the present embodiment, even when memory of the user is unreliable, it is possible to easily scroll and redisplay images according to unreliable memory of the user.

Figure 8:
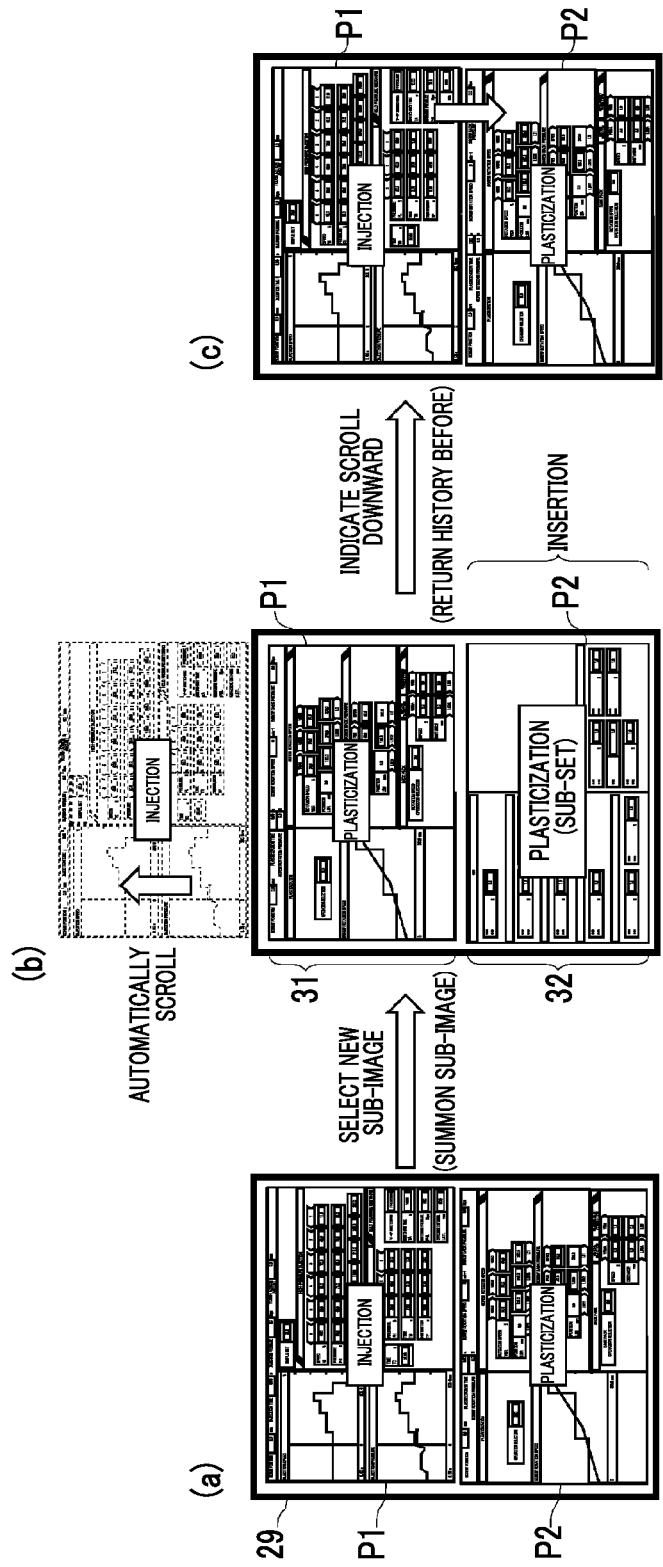
FIG. 8 shows an example in which a specific display image is erased (display is stopped) from a history of the display images, (a) shows a display example before the display image is erased, (b) shows an example in which a new selected display image is displayed on the display unit, and (c) shows a display example after the history of display image selected newly is erased (display is stopped).

[History Erasure Function of Display Image (FIG. 8)]

The control device 20 of the present embodiment stores the selected display images in a history. However, if a number of display histories increases, the load on the user may increase. Accordingly, the control device 20 can have a function of erasing an arbitrary display image, which is laid out at an arbitrary position in the display history, from the display history.

For example, as shown in FIG. 8(a), in the state where the setting image of the injection process is displayed as the first display image P1 and the setting image of the plasticization process is displayed as the second display image P2, the setting image (hereinafter, referred to as a sub-setting image) of the plasticization process positioned at a hierarchy below the second display image P2 is selected. Accordingly, as shown in FIG. 8(b), the control device 20 of the present embodiment displays the sub-setting image on the second display area 32. The operations so far are the same as the automatic insertion and scroll function (FIGS. 5(a) and 5(b)) of the above-described new selection image information.

For example, in some cases, the user ends the input of the conditions required for the sub-setting image A, and thereafter, the user may determine that it is not necessary to display the sub-setting image A. In addition, with respect to the plasticization process, when another sub-setting image B exists, if the sub-setting image B is newly selected and appears in the display history, thereafter, unnecessary sub-setting images A are displayed one by one, and the operation efficiency of the scrolling of the user may deteriorate. Accordingly, if unnecessary sub-setting images A exist, it is not possible to display the sub-setting image B so as to be adjacent to the setting image of the plasticization process positioned in the upper hierarchy. Accordingly, the control device 20 includes the function of erasing the unnecessary display images from display histories stored in the storage unit 20b according to the instruction of the user. That is, if instructions for erasure from the display history such as touching on an erasure switch or performing touch action for erasing are given to the sub-setting image shown in FIG. 8(b), the scrolling is automatically performed, and as shown in FIG. 8(c), the display is returned to the display before the sub-setting image is selected. In addition, thereafter, even when the user instructs the upward scrolling, since the display history is erased, the sub-setting image in which the display is stopped is not displayed on the display unit 29.

As described above, since the control device 20 including the history erasure function of the display image can display only the necessary image information, the user does not feel stress due to unnecessary images being displayed, and the injection molding machine 1 having high operability is provided.

[Exchange Function Between First Area and Second Area (FIG. 9)]

The control device 20 of the present embodiment is operated according to the rule in which the image information having the older position in the display history is displayed on the first display area 31 and the image information having the new display history is displayed on the second display area 32. However, for example, the user operating the injection molding machine 1 may habitually display the setting image of the injection process on the first display area 31 and the setting image of the plasticization process on the second display area 32. However, the user may erroneously set the procedure of the selection, and the user may display the setting image of the plasticization process on the first display area 31 and the setting image of the injection process on the second display area 32 (the right drawing of FIG. 9).

In order to change the disposition of the images set according to habit of the user, after the display histories of the setting image of the plasticization process and the setting image of the injection process are erased, the setting image of the injection process and the setting image of the plasticization process may be selected again in this order. However, since this causes a load on the user, the control device 20 includes a function of exchanging an arbitrary image laid out so as to be adjacent to the image displayed on the first display area 31 and the display history displayed on the second display area 32. The left drawing of FIG. 9 is the drawing after the exchange is performed. The setting image of the injection process is displayed on the first display area 31, the setting image of the plasticization process is displayed on the second display area 32, and the user may perform the operation in accordance with the user's habit.

The operation of performing the exchange function of the images may be performed according to any method. For example, a button for instructing the exchange may be provided on the display unit 29, a command for instructing the exchange function may be assigned to a specific key of the key input unit 25, and the exchange operation of the screen may be performed by a predetermined touch action.

[Horizontal Scroll Function (FIGS. 10 and 11)]

In the control device 20 of the present embodiment, in principle, the scrolling is performed in the vertical direction. However, scrolling in the horizontal direction may be required or may be effective to increase the efficiency of the setting operation of the user. Accordingly, as described below, the control device 20 allows an arbitrary image laid out at an arbitrary position in the display history to the scrolling in the horizontal direction.

For example, as shown in FIG. 10(a), the setting image of the injection process is displayed on the first display area 31, and a constant setting image (first page) is displayed on the second display area 32. The constant setting image is an image for setting a control constant required so as to perform the injection process. Since the number of the required control constants is very great, it is difficult to display all control constants on the second display area 32 at one time. Accordingly, the constant setting image is divided into three pages, and in the example shown in FIG. 10, the constant setting images of three pages are selected previously. In addition, the constant setting images of three pages are arranged in a horizontal direction X in advance. Moreover, the constant setting image is displayed on the first display area 31, and the setting image of the injection process can be displayed on the second display area 32.

When the user ends the input for the control constants required with respect to the constant setting image of the first page displayed on the second display area 32, in order to input the control constants required with respect to the constant setting image of the next and second page, the user instructs the scrolling in the horizontal direction X. Accordingly, as shown in FIG. 10(b), the constant setting image of the second page is displayed on the second display area 32. In addition, when the user ends the input for the control constants required with respect to the constant setting image of the second page, in order to display the constant setting image of a third page on the second display area 32, the user may instruct the scrolling in the horizontal direction X. Here, in the drawing, the leftward scrolling is described. However, in order to perform confirmation after the input of the control constants of the three pages ends, a rightward scrolling may be performed according to the instruction of the user.

In addition, the right position and the left position of the constant setting images of the first to third pages may be conversely disposed. Moreover, switching between the right and left positions and switching between the scroll directions may be performed by a touching operation of one touch type or a switch operation.

In this case, the method of instructing the scrolling may be performed by any method. For example, a swipe operation in which the surface of the second display area 32 is traced in the horizontal direction X may be applied, or a key assigned to the key input unit 25 may be operated. In addition, as shown in FIG. 10, when the display images are arranged in the horizontal direction X, in order to prevent the setting image of the injection process displayed on the first display area 31 from erroneously being scrolled in the vertical direction Y, the scroll instruction may be limited instruction in the horizontal direction X so that the scroll instruction in the vertical direction Y is not received. Moreover, when the display images are arranged in the horizontal direction X, in a state where the scroll instructions with respect to both directions of the horizontal direction X and the vertical direction Y are waited, in the case where the scroll instruction is given in the vertical direction Y, the setting images may be scrolled in the state where the setting images are arranged in the horizontal direction X. That is, when the upward scrolling is instructed in the state where the setting images are arranged in the horizontal direction X on the second display area, the setting image which has been displayed on the second display area is displayed on the first display area, and the scrolling may be performed in the horizontal direction X on the first display area.

In addition, both display images displayed on the first display area 31 and the second display area 32 may be scrolled in the horizontal direction X independently or synchronously.

In the present embodiment, the constant setting images of the three pages are arranged in the horizontal direction X in advance. However, a method for realizing the arrangement may be performed by any method. For example, the constant setting images of the three pages may be stored in the control device 20 as one determined piece of information, and when the constant setting image is selected from the menu, after the constant setting image are developed on three pages, the constant setting images are arranged in the horizontal direction X. In addition, the information of the constant setting images of three pages are stored in the control device 20 for each page, and if some pieces of the image information of one page are selected, the other image information of two pages is simultaneously selected and can be arranged in the horizontal direction X. In the method of the latter, the portions between the image information of three pages are linked to each other.

In addition, the images arranged in the horizontal direction X are not limited to the constant setting image. For example, setting images or data list images of a plurality of processes closely related to each other may be associated with each other, and may be stored in the storage unit 20b. In addition, when some images are selected and displayed, the image associated with the image, to which the scroll instruction is given in the horizontal direction X, may be scrolled and displayed in the horizontal direction X. For example, a sub-setting screen may be associated with a main-setting screen of the plasticization process, and when the scroll instruction in the horizontal direction X is performed in the state where the main setting image is displayed, the sub-setting screen may be displayed. In addition, a large number of data lists such as trend data lists or control signal lists displayed in the extension display mode may be scrolled and displayed in the horizontal direction X in the state where the extension display image is maintained. Moreover, in a case where the display modes obtained by switching to the extension display mode are a pair of display images configured of an upper display image and a lower display image having a hierarchical configuration, when the plurality of lower sub-setting image groups are associated with the upper main setting image, the main setting image is not scrolled and displayed in the horizontal direction X, and only the lower sub-setting image groups can be scrolled in the horizontal direction X.

As described above, in the control device 20 having the horizontal scroll function, since it is possible to input the required control constants while referring to the setting image of the plasticization process by simply scrolling the constant setting images of three pages, workability increases. In addition, according to the present embodiment, since the constant setting images of three pages can be arranged in the horizontal direction X without selecting the constant setting image of each page individually from the menu screen, it is possible to simplify the menu screen.

Hereinbefore, the present invention is described with reference to the embodiment. However, the configurations described in the embodiment may be selected and be appropriately modified so as to be other configurations without departing from the gist of the present invention.

For example, the display unit 29 has the vertically long display area. However, the display method of the present invention may be also applied to display means including a horizontally long display area. In this case, synchronization of the scrolling is performed along the horizontal direction X.

Moreover, the present invention includes the standard display mode and the extension display mode. However, the present invention may include other display modes. For example, if necessary, the present invention may include a display method of dividing the display area into four. In addition, the display image may be displayed so as to be locally enlarged.

Moreover, in the present embodiment, according to the standard display mode, the display area is divided into two equal parts. However, the display area of the first display area 31 and the display area of the second display area 32 may be different from each other. For example, the division may be performed so that a ratio between the display area of the first display area 31 and the display area of the second display area 32 becomes 6:4, and it is possible to change the ratio between the display areas of the first display area 31 and the second display area 32 based on the instruction from the user while adopting bisection as the default.

Moreover, the display history stored in the storage unit 20b and the user ID may be read by the control device 20 again according to operations of the molding conditions input or the like by the user, or the display history may be initialized by a reset operation of the display history, and the connection procedure or the layout of the operation screen may be stored in the storage unit 20b associated with the ID of the user may be read again and may be displayed on the display unit 29.

In addition, the display image which has been displayed before two generations in the display history, for example, the setting image of the injection process may not be scrolled and redisplayed, and the setting image of the injection process may be newly selected again from the menu and may be displayed. In this case, preferably, the display history of the setting image of the injection process before two generations in the display history is erased.

Moreover, when the power source of the control device 20 is turned off, the display history may be reset, or when the display history is stored in the storage unit 20b immediately before the power source is turned off and the control device 20 turns on the power source again, the display history stored in the storage unit 20b immediately before the power source is turned off may be read and may be displayed on the display unit 29.

Reference Signs List

- 1: injection molding machine
- 10: molding machine main body
- 11: mold clamping unit
- 12: stationary platen
- 13: movable platen
- 15: plasticizing unit
- 16: heating cylinder
- 20: data holding unit
- 20: control device
- 21: man-machine interface
- 23: switch button
- 25: key input unit
- 27: touch panel
- 28: detection unit
- 29: display unit
- 30: entire display area
- 31: first display area
- 32: second display area
- OC: operation command information
- SR: sensing information
- P1: first display image
- P2: second display image
- X: horizontal direction
- Y: vertical direction

The invention claimed is:

1. An injection molding machine, comprising:
    a molding machine main body including a mold clamping unit having a first sensor and a plasticizing unit having a second sensor; and
    a control device communicating with the molding machine main body to receive sensing information obtained from the first and second sensors during an injection molding process, and generating operation command information with the sensing information to drive the molding machine main body and to send the operation command information to the molding machine main body, the control device including
        a display unit which displays a single display image or a plurality of display images including information relating to molding conditions of the injection molding machine;
        a control unit which controls display of the display image on the display unit; and
        a storage unit which stores in advance the plurality of display images and stores a display history associated with a temporal order in which the plurality of display images is displayed on the display unit,
    wherein the control unit divides the display unit into a first display area and a second display area,
    wherein the control unit controls the display unit to display a first display image on the first display area and a second display image on the second display area, and
    when the control unit receives an instruction to scroll in a first direction, the control unit scrolls the plurality of display images to be displayed on the display unit in a state where an anteroposterior relationship in the temporal order in the display of the display images stored in the storage unit with respect to at least one of the first display image displayed on the first display area or the second display image displayed on the second display area is maintained, and
    wherein an ID is assigned to each user, or each mold or target molded part in advance, a storage area of the control device is allocated to each ID, and a display procedure of operation screens is stored for each ID, and
    the display procedure is performed by an operation of the user of storing setting images and the display history, which are actually displayed when the user selects the molding conditions, or
    alternatively, the setting images which are frequently used by the user, and the display procedures are learned by the control device, and
    the control device automatically sets the display procedure of each ID, and the display procedure is stored in the storage unit and is summoned so as to be displayed.

2. The injection molding machine according to claim 1, wherein the control device includes
    a standard display mode in which the display unit is divided into the first display area and the second display area, and the single display image or the plurality of display images is displayed; and
    an extension display mode in which the single display image is displayed on an entire display area of the display unit,
    wherein when one of the first display image and the second display image which are displayed in the standard display mode is selected, either the selected first display image or the selected second display image is displayed in the extension display mode.

3. The injection molding machine according to claim 2, wherein a display history with respect to one of the first display image and the second display image which are not selected is stored in the storage unit.

4. The injection molding machine according to claim 2, wherein when the display image having an older position in the display history is displayed in the extension display mode, in a case where a third display image is required to be displayed,
    display of the display image having an older position in the display history is interrupted, and the third display image is displayed in the extension display mode, or
    the display image which is displayed in the extension display mode and has an older position in the display history is displayed in the standard display mode, and the third display image is displayed to be adjacent to the display image having an older position in the display history in the standard display mode.

5. The injection molding machine according to claim 1, wherein when the first display image having an older position in the display history and the second display image having a newer position in the display history are displayed, in a case where a third display image is required to be displayed, the third display image is displayed to be adjacent to the second display image, and the display of the first display image is interrupted.

6. The injection molding machine according to claim 1, wherein when the first display image and the second display image are displayed on the display unit to be adjacent to each other, at least one of the selected first display image and the selected second display image is locked so as not to be scrollable.

7. The injection molding machine according to claim 1, wherein information specifying the display image, which is not displayed but remains in the display history, is displayed on the display unit.

8. The injection molding machine according to claim 1, wherein when the first display image and the second display image are displayed on the display unit to be adjacent to each other, the display with respect to one or both of the selected first display image and the selected second display image is stopped.

9. The injection molding machine according to claim 1, wherein when the first display image is displayed on the first display area and the second display image is displayed on the second display area, based on an instruction, display positions are exchanged with each other such that the first display image is displayed on the second display area and the second display image is displayed on the first display area.

10. The injection molding machine according to claim 1, wherein when the first display image is displayed on the first display area and the second display image is displayed on the second display area, scrolling in a second direction orthogonal to the first direction is allowed in one or both of the first display area and the second display area.

11. A display method of an image in a control device for an injection molding machine, comprising:
preparing the injection molding machine including a molding machine main body including a mold clamping unit having a first sensor and a plasticizing unit having a second sensor; and the control device communicating with the molding machine main body to receive sensing information obtained from the first and second sensors during an injection molding process and generating operation command information with the sensing information to drive the molding machine main body and to send the operation command information to the molding machine main body,
preparing the control device including a display unit which displays a single display image or a plurality of display images including information relating to molding conditions of the injection molding machine, a control unit which controls display of the display image on the display unit, and a storage unit which stores in advance the plurality of display images and stores a display history associated with a temporal order in which the plurality of display images is displayed on the display unit,
dividing the display unit into a first display area and a second display area,
controlling the control unit so that when the display image is displayed on at least one of the first display area or the second display area, the plurality of display images is scrolled to be displayed on the display unit in a state where a temporal anteroposterior relationship in the display of the display images stored in the storage unit with respect to at least one of the display images displayed on the first display area or the second display area is maintained, and
assigning an ID to each user, or each mold or target molded part in advance, allocating a storage area of the control device to each ID, and storing a display procedure of operation screens for each ID, the display procedure being performed by an operation of the user of storing setting images and the display history, which are actually displayed when the user selects the molding conditions, or
alternatively, learning, by the control device, the setting images which are frequently used by the user, and the display procedures; and automatically setting the display procedure of each ID by the control device, and storing the display procedure in the storage unit and summoning the display procedure so as to be displayed.

12. A control device for an injection molding machine, the injection molding machine comprising a molding machine main body including a mold clamping unit having a first sensor and a plasticizing unit having a second sensor,
the control device being configured to communicate with the molding machine main body to receive sensing information obtained from the first and second sensors during an injection molding process, and generating operation command information with the sensing information to drive the molding machine main body and to send the operation command information to the molding machine main body,
the control device including
a display unit which displays a single display image or a plurality of display images including information relating to molding conditions of the injection molding machine;
a control unit which controls display of the display image on the display unit; and
a storage unit which stores in advance the plurality of display images and stores a display history associated with a temporal order in which the plurality of display images is displayed on the display unit,
wherein the control unit divides the display unit into a first display area and a second display area, and
wherein the control unit controls the display unit to display a first display image on the first display area and a second display image on the second display area, and
when the control unit receives an instruction to scroll in a first direction, the control unit scrolls the plurality of display images to be displayed on the display unit in a state where an anteroposterior relationship in the temporal order in the display of the display images stored in the storage unit with respect to at least one of the first display image displayed on the first display area or the second display image displayed on the second display area is maintained, and
wherein an ID is assigned to each user, or each mold or target molded part in advance, a storage area of the control device is allocated to each ID, and a display procedure of operation screens is stored for each ID, and
the display procedure is performed by an operation of the user of storing setting images and the display history, which are actually displayed when the user selects the molding conditions, or
alternatively, the setting images which are frequently used by the user, and the display procedures are learned by the control device, and
the control device automatically sets the display procedure of each ID, and the display procedure is stored in the storage unit and is summoned so as to be displayed.

13. The control device according to claim 12, wherein the control device includes
a standard display mode in which the display unit is divided into the first display area and the second display area, and the single display image or the plurality of display images is displayed; and
an extension display mode in which the single display image is displayed on an entire display area of the display unit,
wherein when one of the first display image and the second display image which are displayed in the standard display mode is selected, either the selected first display image or the selected second display image is displayed in the extension display mode.

14. The control device according to claim 13,
wherein when the display image having an older position in the display history is displayed in the extension display mode, in a case where a third display image is required to be displayed,
 display of the display image having an older position in the display history is interrupted, and the third display image is displayed in the extension display mode, or
 the display image which is displayed in the extension display mode and has an older position in the display history is displayed in the standard display mode, and the third display image is displayed to be adjacent to the display image having an older position in the display history in the standard display mode.

15. The control device according to claim 12,
wherein a display history with respect to one of the first display image and the second display image which are not selected is stored in the storage unit.

16. The control device according to claim 12,
wherein when the first display image having an older position in the display history and the second display image having a newer position in the display history are displayed, in a case where a third display image is required to be displayed, the third display image is displayed to be adjacent to the second display image, and the display of the first display image is interrupted.

17. The control device according to claim 12,
wherein when the first display image and the second display image are displayed on the display unit to be adjacent to each other, at least one of the selected first display image and the selected second display image is locked so as not to be scrollable.

18. The control device according to claim 12,
wherein information specifying the display image, which is not displayed but remains in the display history, is displayed on the display unit.

19. The control device according to claim 12,
wherein when the first display image and the second display image are displayed on the display unit to be adjacent to each other, the display with respect to one or both of the selected first display image and the selected second display image is stopped.

20. The control device according to claim 12,
wherein when the first display image is displayed on the first display area and the second display image is displayed on the second display area, based on an instruction, display positions are exchanged with each other such that the first display image is displayed on the second display area and the second display image is displayed on the first display area.

* * * * *